US009513639B2

(12) United States Patent
Tsuzaki et al.

(10) Patent No.: US 9,513,639 B2
(45) Date of Patent: Dec. 6, 2016

(54) SYSTEM AND METHOD FOR DERIVING STORAGE TANK OPERATION PLAN

(71) Applicant: OSAKA GAS Co., Ltd., Osaka (JP)

(72) Inventors: Kenji Tsuzaki, Osaka (JP); Kaoru Kawamoto, Osaka (JP); Tomohito Okamura, Osaka (JP); Hiromasa Tani, Osaka (JP); Tomokazu Ueda, Osaka (JP); Nobuaki Hashimoto, Osaka (JP); Keisuke Kawata, Osaka (JP); Takahito Tanabe, Tokyo (JP); Kouhei Harada, Tokyo (JP); Atsushi Nitanda, Tokyo (JP); Toshihiro Nitta, Tokyo (JP)

(73) Assignee: OSAKA GAS CO., LTD., Osaka (JP)

( * ) Notice: Subject to any disclaimer, the term of this patent is extended or adjusted under 35 U.S.C. 154(b) by 372 days.

(21) Appl. No.: 14/352,656

(22) PCT Filed: Oct. 19, 2012

(86) PCT No.: PCT/JP2012/077102
§ 371 (c)(1),
(2) Date: Apr. 17, 2014

(87) PCT Pub. No.: WO2013/061883
PCT Pub. Date: May 2, 2013

(65) Prior Publication Data
US 2014/0303792 A1 Oct. 9, 2014

(30) Foreign Application Priority Data

Oct. 24, 2011 (JP) .................................. 2011-232608

(51) Int. Cl.
*G06Q 50/08* (2012.01)
*G05D 9/12* (2006.01)
(Continued)

(52) U.S. Cl.
CPC ................ *G05D 9/12* (2013.01); *G06Q 10/04* (2013.01); *G06Q 10/06* (2013.01); *G06Q 50/06* (2013.01)

(58) Field of Classification Search
None
See application file for complete search history.

(56) References Cited

U.S. PATENT DOCUMENTS

2007/0214031 A1* 9/2007 Amano .................. G06Q 10/04
705/7.11
2007/0227187 A1* 10/2007 Coward ................. F25J 3/0209
62/628

(Continued)

FOREIGN PATENT DOCUMENTS

JP 2003130296 A 5/2003
JP 2005263486 A 9/2005

(Continued)

OTHER PUBLICATIONS

Nannicini, Giacomo, et al.; "Rounding-based heuristics for nonconvex MINLPs", Math. Prog. Comp., (2012) vol. 4, pp. 1-31.

(Continued)

*Primary Examiner* — Isaac T Tecklu
(74) *Attorney, Agent, or Firm* — Haynes Beffel & Wolfeld LLP

(57) ABSTRACT

To derive a feasible solution for an operation plan problem for storage tanks for storing liquefied natural gas, which is a complicated mixed-integer non-linear problem, given tank initial state information, reception plan information, and feed plan information, two solving processes are executed alternately two or more times, respectively: a first solving process that replaces a mixed-integer non-linear programming problem with a mixed-integer linear programming problem by linear approximation of a non-linear expression in non-linear constraints containing the non-linear expression, and solves the problem to derive provisional solutions or final solutions for a reception pattern that prescribes a storage tank that is to receive liquefied natural gas, and a discharge pattern that prescribes a storage tank that is to discharge liquefied natural gas, and a second solving process that replaces a mixed-integer non-linear programming problem with a continuous non-linear programming problem by provisionally fixing a discrete variable in discrete constraints containing the discrete variable, and solves the problem to derive provisional solutions or final solutions for transitions of storage quantity and storage heat quantity of liquefied natural gas in each storage tank.

20 Claims, 9 Drawing Sheets

(51) Int. Cl.
*G06Q 50/06* (2012.01)
*G06Q 10/06* (2012.01)
*G06Q 10/04* (2012.01)

(56) References Cited

U.S. PATENT DOCUMENTS

| | | | | |
|---|---|---|---|---|
| 2010/0088075 | A1* | 4/2010 | Yin | B01J 19/0033 703/2 |
| 2011/0119037 | A1* | 5/2011 | Rashid | E21B 43/12 703/2 |
| 2012/0010757 | A1* | 1/2012 | Francino | G05B 15/02 700/291 |
| 2012/0010758 | A1* | 1/2012 | Francino | G05B 17/02 700/291 |
| 2012/0108117 | A1* | 5/2012 | Kwon | B63B 25/14 440/6 |

FOREIGN PATENT DOCUMENTS

| | | |
|---|---|---|
| JP | 2009-539188 A | 11/2009 |
| JP | 2010523924 A | 7/2010 |
| WO | 2007117717 A2 | 10/2007 |
| WO | 2007/143150 A2 | 12/2007 |
| WO | 2010/151668 A1 | 12/2010 |

OTHER PUBLICATIONS

Tanaka, Yoichi, et al., "Optimal Design of Cogeneration Systems by Mathematical Programming", Systems Control and Information, (2008), vol. 21, No. 7, pp. 201-210.

* cited by examiner (A) List of continuous variables

| | |
|---|---|
| $v_j^t$ | Volume of storage tank j at point of time t |
| $q_j^t$ | Density of storage tank j at point of time t |
| $x_{i,j}^t$ | Transfer quantity from storage tank i to storage tank j at point of time t |
| $y_j^t$ | Reception quantity of storage tank j at point of time t |
| $z_{j,l}^t$ | Discharge quantity from storage tank j to discharge line l at point of time t |
| $zp_{k,j}^t$ | Discharge quantity from discharging pump k of storage tank j at point of time t |
| $w_j^t$ | BOG generation amount from storage tank j (value in terms of liquid) at point of time t |
| $xc_{l,j}^t$ | Cooling return quantity from discharge line l to storage tank j at point of time t |
| $lq_l^t$ | Density of discharge line l at point of time t |
| $qc^t$ | Density of cooling return LNG at point of time t |
| $mw_m^t$ | Quantity of BOG mixed into feeding destination m at point of time t |

(B) List of discrete variables

| | |
|---|---|
| $\delta_j^t$ | Binary variable defining whether reception is conducted in storage tank j at point of time t |
| $ix_{i,j}^t$ | Binary variable defining whether transfer from storage tank i to storage tank j is conducted at point of time t |
| $izp_{k,j}^t$ | Binary variable defining whether discharging pump k of storage tank j is made to operate at point of time t |

(C) List of constants

| | | |
|---|---|---|
| $b_t$ | 1 | Reception quantity in reception plan at point of time t |
| $b_t^q$ | 1 | Reception density in reception plan at point of time t |
| $c_m^t$ | 1 | Feed plan quantity to feeding destination m in feed plan at point of time t |
| $qw$ | 2 | Density of BOG (in terms of liquid) |
| $V_j^L$ | 3 | Lower limit value for volume of storage tank j |
| $V_j^U$ | 3 | Upper limit value for volume of storage tank j |
| $U_{i,j}^x$ | 3 | Upper limit value for transfer quantity from storage tank i to storage tank j |
| $U_{j,l}^z$ | 3 | Upper limit value for discharge quantity from storage tank j to discharge line l |
| $kU_j$ | 3 | Upper limit value for discharge quantity from discharging pump k |
| $A_l$ | 4 | Upper limit value for average density of discharge line l |
| $B_l^L$ | 4 | Lower limit value for instant density of discharge line l |
| $B_l^U$ | 4 | Upper limit value for instant density of discharge line l |
| $cl_l^t$ | 3 | Cooling return quantity from discharge line l to predetermined transfer line at point of time t |
| $T$ | 1 | Planning period |

| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| Area A1 | K101 | | | | | | | | | | | | | | | | | | | | | | | | | | | | | | ○ |
| | K102 | | | ○ | | | | | ○ | | | | | | | | | | ○ | | | | | | | | | ○ | | | |
| | K103 | | K204 | ○ | | K203 | K204 | | | | | | | | | | | | | | ○ | | | | | | | | K206 | | ○ |
| | K104 | | K206 | ○ | K108 | | | | ○ | | | K201 | ○ | | K204 | | | | | | ○ | | | | | | | ○ | | | ○ |
| | K105 | | | | | | | | | | | | | | | | | | | | | | | | | | | | | | |
| | K106 | | | | | | | | | | | | | | | | | | | | | | | | | | | | | | |
| | K107 | | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ |
| | K108 | ▲ | | | | | | | | | | | | | | | | | | | | | | | | | | | | | |
| Area A2 | K201 | ○ | | | | | | | | | | | | | | | | | | | | | | | | | | | | | |
| | K202 | | | | | | | | | | | | | | | | | | | | | | | ○ | | | | | | | |
| | K203 | ○ | | | | | | | | | | | | | | | | | | | | K203 | | ○ | | | | | | | |
| | K204 | ▲ | ▲ | ▲ | ▲ | ▲ | ▲ | ▲ | ▲ | K204 | K205 | ▲ | ▲ | ▲ | K205 | ○ | ▲ | ▲ | ▲ | ▲ | ▲ | ▲ | ▲ | ▲ | ▲ | ▲ | ▲ | ▲ | ▲ | ▲ | ▲ |
| | K205 | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ | ▲ |
| | K206 | | | | | | | | | | | | | | | | | | | | | | | | | | | | | | |

○: Receiving tank
▲: Cooling return tank

| t | Storage tanks as discharge sources | | | | |
|---|---|---|---|---|---|
| 1 | K103 | K104 | K106 | K107 | |
| 2 | K103 | K104 | K106 | K107 | |
| 3 | K103 | K104 | K106 | K107 | |
| 4 | K101 | K102 | K103 | K107 | K108 |
| 5 | K101 | K102 | K103 | K107 | K108 |
| 6 | K101 | K102 | K103 | K107 | K108 |
| 7 | K101 | K102 | K103 | K107 | K108 |
| 8 | K101 | K102 | K103 | K107 | K108 |
| 9 | K101 | K102 | K103 | K107 | K108 |
| 10 | K101 | K102 | K103 | K107 | K108 |
| 11 | K101 | K102 | K103 | K107 | K108 |
| 12 | K101 | K102 | K103 | K107 | K108 |
| 13 | K101 | K102 | K103 | K107 | K108 |
| 14 | K101 | K102 | K103 | K107 | K108 |
| 15 | K101 | K102 | K103 | K107 | K108 |
| 16 | K101 | K102 | K103 | K107 | K108 |
| 17 | K101 | K102 | K103 | K107 | K108 |
| 18 | K101 | K102 | K103 | K107 | K108 |
| 19 | K101 | K102 | K103 | K107 | K108 |
| 20 | K101 | K102 | K103 | K107 | K108 |
| 21 | K101 | K102 | K103 | K107 | K108 |
| 22 | K101 | K102 | K103 | K107 | K108 |
| 23 | K101 | K102 | K103 | K107 | K108 |
| 24 | K101 | K102 | K103 | K107 | K108 |
| 25 | K101 | K102 | K103 | K107 | K108 |
| 26 | K101 | K102 | K103 | K107 | K108 |
| 27 | K101 | K102 | K103 | K107 | K108 |
| 28 | K101 | K102 | K103 | K107 | K108 |
| 29 | K101 | K102 | K103 | K107 | K108 |
| 30 | K101 | K102 | K103 | K107 | K108 |

FIG. 8

| t | Priority of discharging pumps | | | | | | | | |
|---|---|---|---|---|---|---|---|---|---|
| 1 | Q105 | Q107 | Q113 | Q115 | Q106 | Q108 | Q116 | Q114 | Q111 | Q112 |
| 2 | Q105 | Q107 | Q113 | Q115 | Q106 | Q108 | Q116 | Q114 | Q111 | Q112 |
| 3 | Q105 | Q107 | Q113 | Q115 | Q106 | Q108 | Q116 | Q114 | Q111 | Q112 |
| 4 | Q101 | Q103 | Q102 | Q113 | Q114 | Q104 | Q105 | Q115 | Q106 | Q116 |
| 5 | Q101 | Q103 | Q102 | Q113 | Q114 | Q104 | Q105 | Q115 | Q106 | Q116 |
| 6 | Q101 | Q103 | Q102 | Q113 | Q114 | Q104 | Q105 | Q115 | Q106 | Q116 |
| 7 | Q105 | Q113 | Q114 | Q106 | Q101 | Q102 | Q103 | Q115 | Q104 | Q116 |
| 8 | Q105 | Q113 | Q114 | Q106 | Q101 | Q102 | Q103 | Q115 | Q104 | Q116 |
| 9 | Q105 | Q113 | Q114 | Q106 | Q101 | Q102 | Q103 | Q115 | Q104 | Q116 |
| 10 | Q103 | Q104 | Q113 | Q101 | Q102 | Q114 | Q105 | Q115 | Q106 | Q116 |
| 11 | Q103 | Q104 | Q113 | Q101 | Q102 | Q114 | Q105 | Q115 | Q106 | Q116 |
| 12 | Q103 | Q104 | Q113 | Q101 | Q102 | Q114 | Q105 | Q115 | Q106 | Q116 |
| 13 | Q101 | Q115 | Q102 | Q116 | Q103 | Q105 | Q113 | Q104 | Q106 | Q114 |
| 14 | Q101 | Q115 | Q102 | Q116 | Q103 | Q105 | Q113 | Q104 | Q106 | Q114 |
| 15 | Q101 | Q115 | Q102 | Q116 | Q103 | Q105 | Q113 | Q104 | Q106 | Q114 |
| 16 | Q101 | Q113 | Q102 | Q106 | Q103 | Q114 | Q116 | Q115 | Q104 | Q106 |
| 17 | Q101 | Q113 | Q102 | Q106 | Q103 | Q114 | Q116 | Q115 | Q104 | Q106 |
| 18 | Q101 | Q113 | Q102 | Q106 | Q103 | Q114 | Q116 | Q115 | Q104 | Q106 |
| 19 | Q105 | Q113 | Q115 | Q102 | Q103 | Q116 | Q101 | Q103 | Q105 | Q104 |
| 20 | Q105 | Q113 | Q115 | Q102 | Q103 | Q116 | Q101 | Q103 | Q105 | Q104 |
| 21 | Q105 | Q113 | Q115 | Q102 | Q103 | Q116 | Q101 | Q103 | Q105 | Q104 |
| 22 | Q105 | Q106 | Q106 | Q106 | Q103 | Q113 | Q115 | Q104 | Q102 | Q116 |
| 23 | Q105 | Q106 | Q106 | Q106 | Q103 | Q113 | Q115 | Q104 | Q102 | Q116 |
| 24 | Q105 | Q106 | Q106 | Q106 | Q103 | Q113 | Q115 | Q104 | Q102 | Q116 |
| 25 | Q101 | Q105 | Q105 | Q102 | Q103 | Q113 | Q115 | Q104 | Q114 | Q116 |
| 26 | Q101 | Q105 | Q105 | Q102 | Q103 | Q113 | Q115 | Q104 | Q114 | Q116 |
| 27 | Q101 | Q105 | Q105 | Q102 | Q103 | Q113 | Q115 | Q104 | Q114 | Q116 |
| 28 | Q101 | Q102 | Q102 | Q106 | Q103 | Q113 | Q115 | Q104 | Q114 | Q116 |
| 29 | Q101 | Q102 | Q102 | Q106 | Q103 | Q113 | Q115 | Q104 | Q114 | Q116 |
| 30 | Q101 | Q102 | Q102 | Q106 | Q103 | Q113 | Q115 | Q104 | Q114 | Q116 |

FIG. 9

SYSTEM AND METHOD FOR DERIVING STORAGE TANK OPERATION PLAN

CROSS-REFERENCE TO RELATED APPLICATIONS

This application is a National Phase filing under 35 U.S.C. §371 of International Application No. PCT/JP2012/077102 filed on Oct. 19, 2012, and which claims priority to Japanese Patent Application No. 2011-232608 filed on Oct. 24, 2011.

TECHNICAL FIELD

The present invention relates to a system and a method for deriving a storage tank operation plan that derives a storage tank operation plan defining a storage tank that is to receive liquefied natural gas and a storage tank that is to discharge liquefied natural gas on the basis of a reception plan and a discharge plan of liquefied natural gas in a predetermined planning period for a plurality of storage tanks for storing liquefied natural gas, as a mathematical programming problem by computerized arithmetic processes.

BACKGROUND ART

As representative solution algorithms for mathematical programming problems, linear programming, mixed-integer linear programming, integer programming, quadratic programming, non-linear programming and so on are known. Linear programming is a solution algorithm for a mathematical programming problem wherein decision variables are continuous variables, and any constraints and an objective function are expressed as linear expressions (linear programming problem). Mixed-integer linear programming is a solution algorithm for a mathematical programming problem wherein decision variables are continuous variables and discrete variables, and any constraints and an objective function are expressed as linear expressions (mixed-integer linear programming problem). Integer programming is a solution algorithm for a mathematical programming problem wherein decision variables are expressed by discrete variables (integer programming problem). Quadratic programming is a solution algorithm for a mathematical programming problem wherein an objective function is expressed as a quadratic expression and constraints are expressed as linear expressions (quadratic programming problem). Non-linear programming is a solution algorithm for a mathematical programming problem wherein any constraints and an objective function are expressed as arbitrary continuous functions that are not linear (non-linear programming problem). When a mathematical plan to be derived is describable as any one of the above typical mathematical programming problems, it can be solved by using a general solver that is appropriate to each existent mathematical programming problem.

As a problem similar to the operation plan problem for storage tanks for storing liquefied natural gas, for example, a "method for controlling reception facility" disclosed in the following Patent Literature 1 is known. This conventional art provides a method for controlling a reception facility capable of planning an operation procedure that allows rapid response to unscheduled reception or discharge while keeping desired material properties as much as possible and minimizes the energy cost, in a short time even when the reception facility is enlarged and complicated, for example, due to increase in numbers of tanks, and assumes fluids such as petroleum, naphtha or gas as the material to be stored.

PRIOR ART LITERATURE

Patent Literature

Patent Literature 1: JP 2005-263486 A

DISCLOSURE OF THE INVENTION

Problems to be Solved by the Invention

In a gas supplier that produces city gas mainly composed of natural gas, and supplies consumers with city gas, liquefied natural gas (LNG) is transported from the place of production to the consuming area by a LNG tanker or the like, and temporarily stored in LNG tanks provided in the consuming area, and a required amount of LNG is discharged from each LNG tank based on the gas demand, and supplied to the demander as city gas with heat quantity adjusted within a predetermined range, through vaporization, heat quantity adjustment and so on.

Conventionally, a system for deriving the general operation plan by a mathematical programming method based on a reception plan and a discharge plan of LNG for storage tanks for storing LNG has not been established. There are peculiar problems to natural gas as shown below in the background. Since natural gas contains nitrogen and plural kinds of hydrocarbons having different physical properties including heat quantity, boiling point, and gravity, such as ethane, propane and butane although it is mainly composed of methane, its composition and heat quantity differ depending on the place of production. While LNG is liquefied at extremely low temperature of about $-162°$ C. or lower, it contains boil off gas (BOG) generated by evaporation of part of LNG at extremely low temperatures due to external heat input in stages of transportation, reception, storage and discharge, and heat quantity of LNG varies between different stages depending on the generation amount of the BOG. Therefore, when change in condition of LNG in each stage is modeled, a complicated non-linear model is established. On one hand, in the case where reception of LNG occurs plural times for plural LNG tanks, the variable that defines a particular tank where particular reception is conducted is a discrete variable. Further, the variable that defines a particular LNG tank from which LNG is to be discharged for a predetermined gas demand is also a discrete variable. On the other hand, variables such as reception quantity, reception heat quantity, storage quantity, storage heat quantity, discharge quantity, and discharge heat quantity of LNG in each LNG tank are continuous variables. Therefore, the operation plan for LNG tanks will be a complicated and large-scale mixed-integer non-linear programming problem because continuous variables and discrete variables are included in decision variables, and constraints and objective functions are represented by complicated non-linear expressions, and the number of variables and the number of constraints are very large, so that a system for deriving an operation plan for LNG tanks is requested to be a system capable of solving such a complicated and large-scale mixed-integer non-linear problem in a practical calculation time.

When the mathematical programming to be derived can be expressed by representative mathematical programming problems as recited above, the problem can be solved by using a general-purpose solver suited for each mathematical programming problem, however, no existent solver can be used for the operation plan problem for storage tanks for storing LNG because the problem is a complicated and large-scale mixed-integer non-linear programming problem as described above.

In general, when a non-linear programming problem is solved, the solution is not guaranteed to be a global optimum solution although it is a local optimum solution, and a problem arises, particularly, in the case of containing a discrete variable. Against such a problem, there is an approach of solving a relaxed mixed-integer linear programming problem by approximating a non-linear constraint to a convex constraint (convex relaxation method). The convex relaxation method is effective for a small-scale non-linear programming problem containing a small number of variables, however, if it is applied to a complicated and large-scale mixed-integer non-linear programming problem containing a large number of variables and a large number of constraints, approximation error for a non-linear constraint is large, and the obtained global optimum solution is not a feasible solution for the operation plan of LNG tanks which is a real problem.

In contrast to this, the conventional art disclosed in Patent Literature 1 describes that a linear programming problem or a quadratic programming problem can be used as a production quantity model for solution because fluid such as petroleum, naphtha and gas is assumed as a material to be stored, and storage quantity and storage heat quantity will not change due to generation of BOG as is the case of LNG (see paragraph [0069]). In other words, when fluid other than liquefied natural gas is dealt with, the problem will not be a complicated mixed-integer non-linear problem, and can be solved as a conventional representative mathematical programming problem.

The present invention was devised in light of the aforementioned problems, and it is an object of the present invention to provide a system and a method for deriving a storage tank operation plan capable of deriving a feasible solution for an operation plan problem for storage tanks for storing liquefied natural gas, expressed as a complicated mixed-integer non-linear problem.

Means for Solving the Problem

As described above, since liquefied natural gas experiences changes in storage quantity and storage heat quantity due to generation of BOG in stages of reception into a storage tank, storage, and discharge, and is subjected to various constraints on heat quantity, a mathematical programming problem for deriving a storage tank operation plan that prescribes storage tanks that are to be a receiving tank and storage tanks that are to be a discharge tank for liquefied natural gas based on a reception plan and a discharge plan of the liquefied natural gas in a predetermined period for a plurality of storage tanks for storing the liquefied natural gas is expressed as a complicated and large-scale mixed-integer non-linear programming problem which is unable to be solved by any existent mathematical programming methods. As a result of diligent efforts, inventors of the present application found that a feasible solution that is a local optimum solution but is similar to a global optimum solution can be obtained by relaxing the storage tank operation plan problem expressed as the mixed-integer non-linear programming problem to two programming problems: a mixed-integer linear programming problem in which non-linear constraints are abstracted by linearly approximating a non-linear expression in constraints, and a continuous non-linear programming problem in which integer constraints and mixed-integer constraints containing a discrete variable in each constraint are abstracted, and solving the respective relaxed programming problems alternately and repeatedly while constraints are elaborated stepwise. And the system and the method for deriving a storage tank operation plan according to the present invention was accomplished based on the new findings.

To achieve the above purpose, a storage tank operation plan deriving system according to the present invention includes:

storage means configured to accept respective inputs of tank initial state information containing initial storage quantity and initial storage heat quantity of liquefied natural gas of each of a plurality of storage tanks for storing the liquefied natural gas, reception plan information containing reception time, reception quantity and reception heat quantity of the liquefied natural gas in each of plural reception plans for the liquefied natural gas, and feed plan information containing feed plan quantity on a predetermined unit period basis in a feed plan for feeding the liquefied natural gas directly or after being vaporized from one or more discharge lines to feeding destinations assigned to each of the discharge lines, in a predetermined planning period, to save each information as input information, and to store a plurality of constraints on reception and storage of the liquefied natural gas into the storage tanks, and a plurality of constraints on discharge of the liquefied natural gas from the storage tanks to the discharge lines; and arithmetic processing means for finding a feasible solution for the storage tank operation plan problem at least on operations of reception and discharge of the liquefied natural gas configured as a mixed-integer non-linear programming problem by the input information and the constraints through computerized arithmetic processes, the arithmetic processing means including first processing means for solving a mixed-integer linear programming problem and second processing means for solving a continuous non-linear programming problem, and being configured to execute, given the input information:

a first solving process including conducting a first relaxing process on each of plural non-linear constraints containing a non-linear expression of the constraints, to replace the mixed-integer non-linear programming problem with a mixed-integer linear programming problem, and solving the mixed-integer linear programming problem by using the first processing means to derive at least provisional solutions or final solutions for a reception pattern that prescribes one or more of the storage tanks that are to be objectives of reception of the liquefied natural gas in each of the reception plans in the planning period, and a discharge pattern that prescribes the storage tank that is to discharge the liquefied natural gas corresponding to the feed plan quantity on the unit period basis, and a second solving process including conducting a second relaxing process on a plurality of discrete form constraints containing discrete variables of the constraints, to replace the mixed-integer non-linear programming problem with a continuous non-linear programming problem, and solving the continuous non-linear programming problem by using the second processing means to derive at least provisional solutions or final solutions for transitions of storage quantity and storage heat quantity of the liquefied natural gas for each of the storage tanks, two or more times, respectively, and in the first solving process of the second or later time, being configured to execute the first relaxing process on at least part of the non-linear constraints by using provisional solutions for transitions of storage quantity and storage heat quantity of the liquefied natural gas derived in the preceding second solving process, and in the second solving process of the first or later time, being configured to execute the second relaxing process on at least part of the discrete form constraints, by using the discrete variables derived in the preceding first solving process.

More preferably, in the storage tank operation plan deriving system having the above characteristic, given the input information, the arithmetic processing means is configured to execute in sequence:

a first arithmetic process that executes the first solving process to derive a final solution for the reception pattern, a provisional solution for the discharge pattern, and provisional solutions for transitions of storage quantity and storage heat quantity of the liquefied natural gas in each of the storage tanks;

a second arithmetic process that executes the second solving process based on the final solution and each of the provisional solutions derived through the first arithmetic process, to derive at least new provisional solutions for transitions of storage quantity and storage heat quantity of the liquefied natural gas in each of the storage tanks;

a third arithmetic process that executes the first solving process based on the final solution and each of most recent ones of the provisional solutions derived through the first and the second arithmetic processes, to derive at least a new provisional solution or a final solution for the discharge pattern; and a fourth arithmetic process that executes the second solving process based on the final solution and each of most recent ones of the provisional solutions derived through the first to the third arithmetic processes, to derive at least new provisional solutions or final solutions for transitions of storage quantity and storage heat quantity of the liquefied natural gas in each of the storage tanks.

More preferably, in the storage tank operation plan deriving system having the above characteristic, in the case where specific storage tanks of the plurality of storage tanks are connected by a transfer line, and the liquefied natural gas is transferable therebetween, the storage means is further configured to store as constraints of the mixed-integer non-linear programming problem, a plurality of constraints on transfer of the liquefied natural gas between the storage tanks, and the arithmetic processing means, given the input information, is configured to sequentially execute the first to the fourth arithmetic processes while not considering at least part of the constraints on transfer, to further derive a provisional solution for a transfer pattern that prescribes the specific storage tanks between which transfer of the liquefied natural gas is to be conducted in the planning period in the first arithmetic process, and a new provisional solution for the transfer pattern in the third arithmetic process, and to further execute:

a fifth arithmetic process that executes the first solving process based on the final solution and each of most recent ones of the provisional solutions derived through the first to the fourth arithmetic processes while considering the constraints on transfer, to derive a new provisional solution of the transfer pattern, and the second solving process based on the final solution and each of most recent ones of the provisional solutions derived through the first to the fifth arithmetic processes while considering the constraints on transfer, to derive final solutions for transitions of storage quantity and storage heat quantity of the liquefied natural gas in each of the storage tanks and a final solution of the transfer pattern.

More preferably, in the storage tank operation plan deriving system having the above characteristic, the arithmetic processing means is configured to execute the first and the second solving processes by using density of the liquefied natural gas that can be approximately converted into the heat quantity in place of heat quantity of the liquefied natural gas contained in the input information and the constraints, and to derive a provisional solution for transition of density of the liquefied natural gas in each of the storage tanks in place of the provisional solution for transition of storage heat quantity of the liquefied natural gas in each of the storage tanks.

More preferably, in the storage tank operation plan deriving system having the above characteristic, in the first relaxing process, mass of the liquefied natural gas represented by a non-linear expression of product of density and volume of the liquefied natural gas contained in the constraints is linearly approximated to a linear polynomial composed of a volume term including standard density as a coefficient, a density term including standard volume as a coefficient, and a constant term.

More preferably, in the storage tank operation plan deriving system having the above characteristic, in the first and the second solving processes, the arithmetic processing means is configured to derive the final solution and the provisional solutions as feasible solutions that minimize an objective function established by weighted summing one or more penalty, the penalty being deviation from a predetermined standard value of an item to be monitored defined by at least one variable of the continuous variables and the discrete variables.

More preferably, in the storage tank operation plan deriving system having the above characteristic, in at least one of the first and the second solving processes, deviation between average heat quantity of the liquefied natural gas fed in a predetermined period for each discharge line, and a predetermined standard heat quantity is contained as one of the penalty.

More preferably, in the storage tank operation plan deriving system having the above characteristic, the storage means is configured to further accept input of detailed feed plan information containing feed plan quantity per unit subdivided period that is subdivision of the predetermined unit period, and to save the information as the input information, and the arithmetic processing means is configured to derive final solutions of the reception pattern and the discharge pattern by executing the first and the second solving processes at least twice, respectively, and to derive subsequently, given the input information containing the detailed feed plan information, discharge quantity per unit subdivided period for each of the storage tanks based on the derived final solutions and each of the preceding provisional solutions.

More preferably, in the storage tank operation plan deriving system having the above characteristic, the discharge pattern prescribes one or more of discharging pumps to be used for discharge of the liquefied natural gas among the discharging pumps interposed between the storage tanks and the discharge line for each discharge line.

More preferably, in the storage tank operation plan deriving system having the above characteristic, the arithmetic processing means uses a processing result at the last point of time of an elapsed part of first planning period that has started but not ended yet, as an initial condition in the first and the second solving processes for a second planning period that starts from the beginning of an unelapsed part of the first planning period.

More preferably, in the storage tank operation plan deriving system having the above characteristic, the constraints contain a constraint for preventing layering that occurs when the liquefied natural gases having different compositions are stored in the storage tank.

Further, a storage tank operation plan deriving method according to the present invention for achieving the above object includes:

an input information storage step of saving the input information in predetermined storage means; and an arithmetic processing step of finding a feasible solution for the storage tank operation plan problem at least on operations of reception and discharge of the liquefied natural gas configured as a mixed-integer non-linear programming problem by the input information, a plurality of constraints on reception and storage of the liquefied natural gas into the storage tanks, and a plurality of constraints on discharge of the liquefied natural gas from the storage tanks to the discharge lines through computerized arithmetic processes, wherein, in the arithmetic processing step, given the input information, a first solving process including conducting a first relaxing process on each of plural non-linear constraints containing a non-linear expression of the constraints, to replace the mixed-integer non-linear programming problem with a mixed-integer linear programming problem, and solving the mixed-integer linear programming problem by using first processing means to derive at least provisional solutions or final solutions for a reception pattern that prescribes one or more of the storage tanks that are to be objectives of reception of the liquefied natural gas in each of the reception plans in the planning period, and a discharge pattern that prescribes the storage tank that is to discharge the liquefied natural gas corresponding to the feed plan quantity on the unit period basis, and a second solving process including conducting a second relaxing process on a plurality of discrete form constraints containing discrete variables of the constraints, to replace the mixed-integer non-linear programming problem with a continuous non-linear programming problem, and solving the continuous non-linear programming problem by using second processing means to derive at least provisional solutions or final solutions for transitions of storage quantity and storage heat quantity of the liquefied natural gas for each the storage tanks are executed two or more times, respectively, and in the first solving process of the second or later time, the first relaxing process is executed on at least part of the non-linear constraints by using provisional solutions for transitions of storage quantity and storage heat quantity of the liquefied natural gas derived in the preceding second solving process, and in the second solving process of the first or later time, the second relaxing process is executed on at least part of the discrete form constraints, by using the discrete variables derived in the preceding first solving process.

In the system and the method for deriving a storage tank operation plan according to the present invention, part of the storage means that stores the input information and the input information storage step, and, the arithmetic processing means and the arithmetic processing step are respectively correspond mutually, and define substantially the same contents. Therefore, input information, constraints, non-linear constraints, discrete form constraints, first and second processing means, first and second relaxing processes, first and second solving processes, first to sixth arithmetic processes, reception pattern, discharge pattern, transfer pattern, and each final solution and each provisional solution have the same contents among the aforementioned system and method for deriving a storage tank operation plan. Therefore, in the arithmetic processing step of the aforementioned storage tank operation plan deriving method, through the aforementioned first to fourth arithmetic processes or through the aforementioned first to sixth arithmetic processes, each final solution and each provisional solution similarly to those by the aforementioned storage tank operation plan deriving system are derived.

Effect of the Invention

Further, according to the system and the method for deriving a storage tank operation plan having the features as described above, by solving an operation plan problem for storage tanks for storing liquefied natural gas expressed as a complicated and large-scale mixed-integer non-linear problem, by solving two kinds of programming problems: a mixed-integer linear programming problem and a continuous non-linear programming problem alternately repeatedly in the separate first solving process and the second solving process, provisional solutions or final solutions for the reception pattern, the discharge pattern and so on which are relevant to discrete variables are obtained by the first solving process, and provisional solutions or final solutions for transitions of storage quantity and storage heat quantity of liquefied natural gas in each storage tank which are relevant to non-linear constraints are obtained by the second solving process. Hence, it is possible to obtain a global optimum solution or a feasible solution close to the same by alternately utilizing the mutual derived results. As a result, a more effective storage tank operation plan can be established by an arithmetic process in a short time, so that appropriate response to change or addition of the reception plan, or change in the discharge plan becomes possible.

BRIEF DESCRIPTION OF THE DRAWINGS

FIG. 4 shows lists of major continuous variables, major discrete variables, and major constants dealt with in a storage tank operation plan problem.

FIG. 7 is a chart showing an example of screen display for a reception pattern, a cooling return pattern, and a transfer pattern.

FIG. 8 is a chart showing an example of screen display for a discharge pattern.

FIG. 9 is a chart showing another example of screen display for a discharge pattern.

DESCRIPTION OF EMBODIMENTS

Hereinafter, embodiments of a system and a method for deriving a storage tank operation plan according to the present invention will be described on the basis of the attached drawings.

Figure 1:
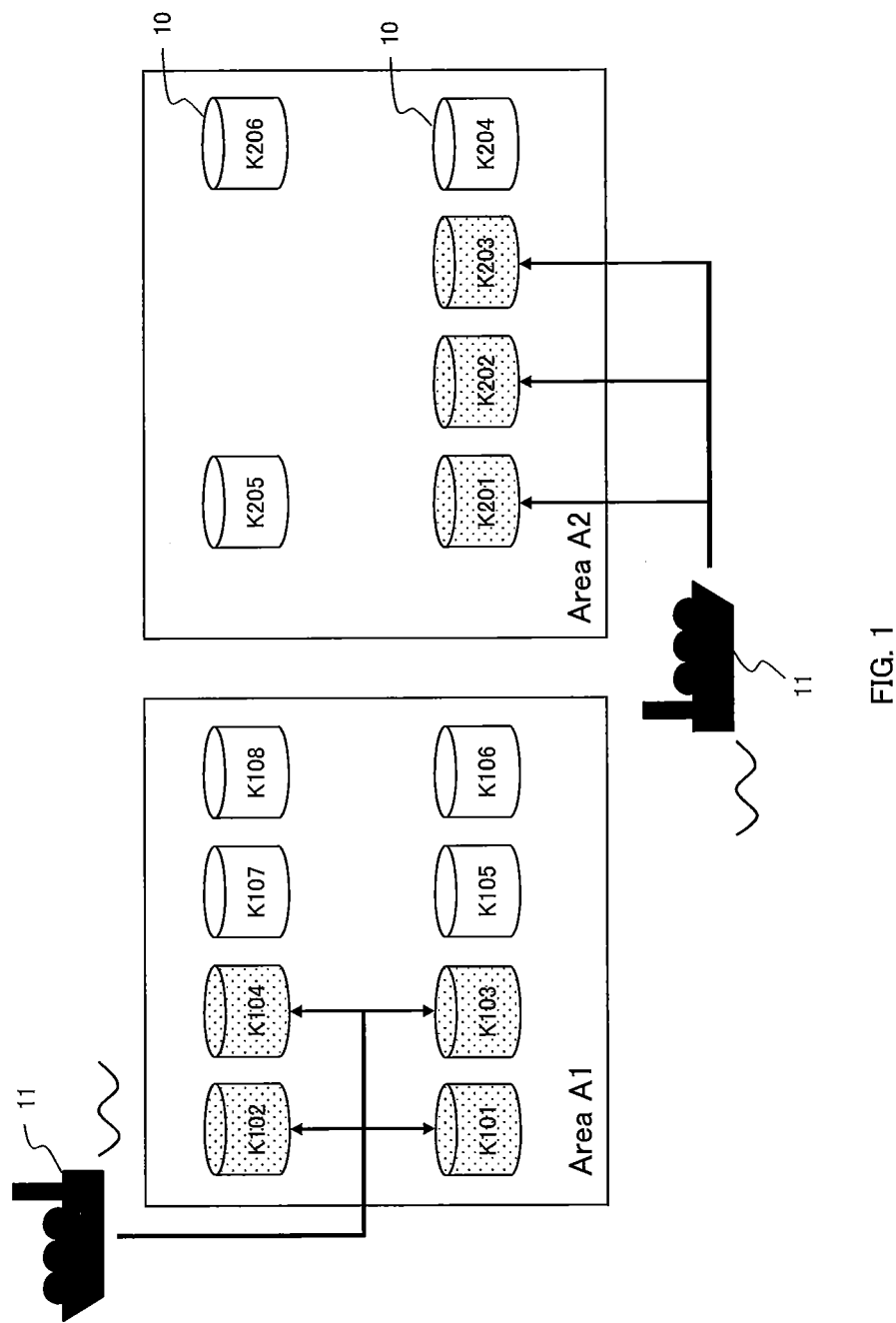
FIG. 1 is an explanatory chart schematically showing a facility configuration involved in a receiving operation of liquefied natural gas for storage tanks, and an outline of contents of the receiving operation.
Figure 2:
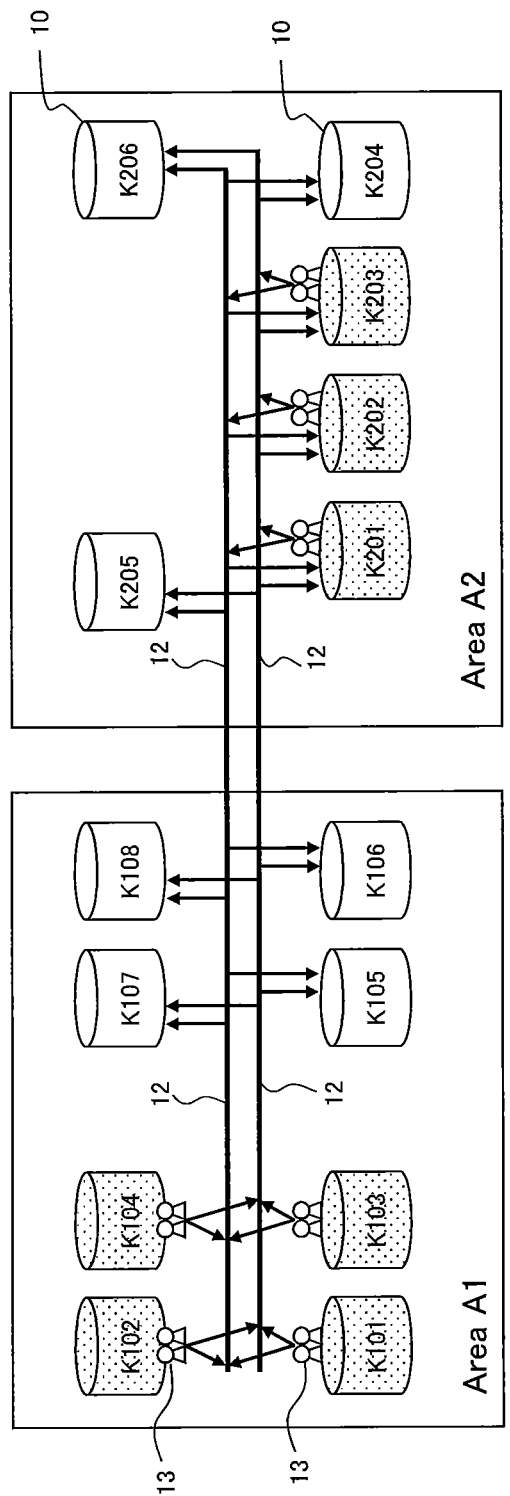
FIG. 2 is an explanatory chart schematically showing a facility configuration involved in a transferring operation of liquefied natural gas for storage tanks, and an outline of contents of the transferring operation.
Figure 3:
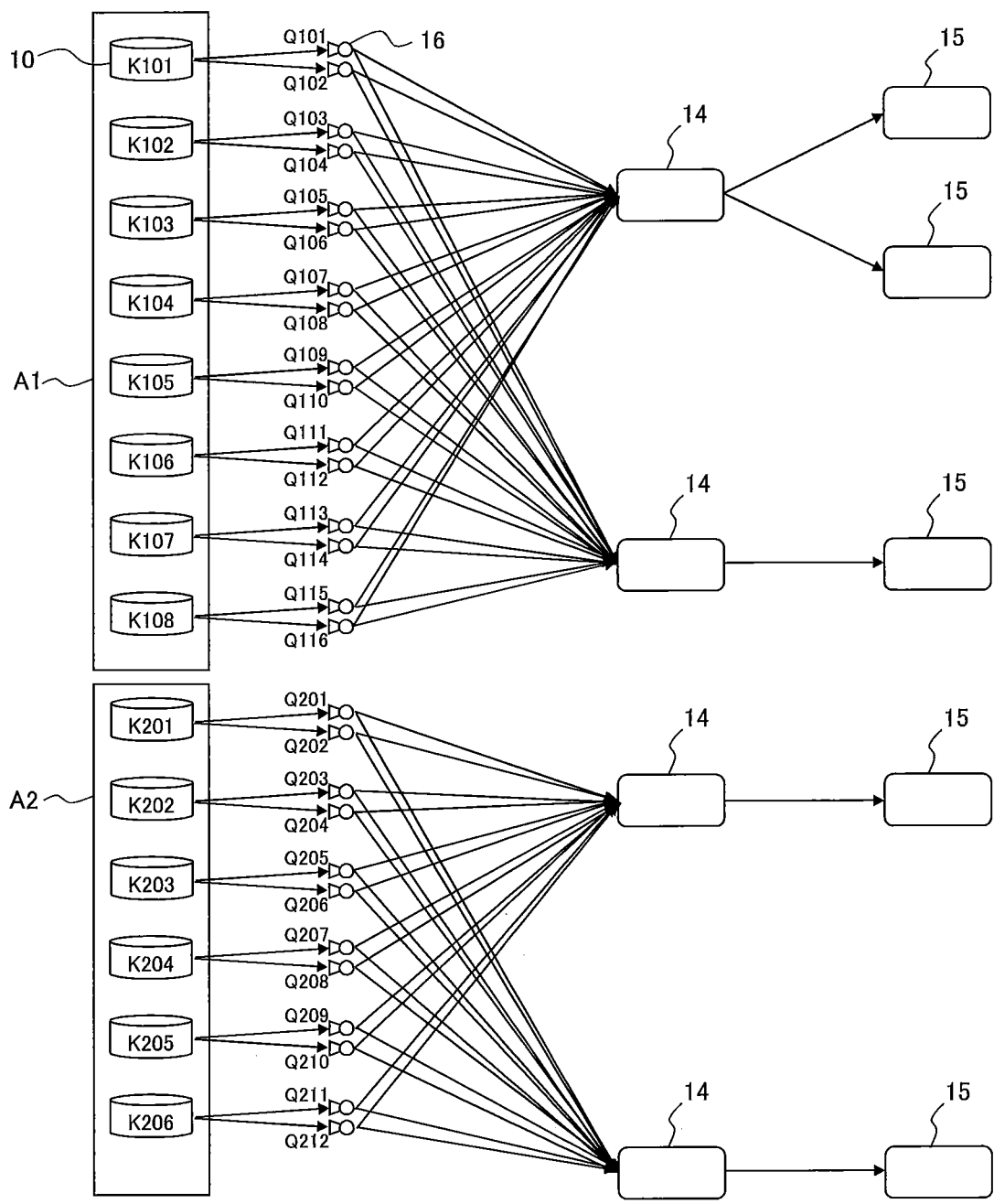
FIG. 3 is an explanatory chart schematically showing a facility configuration involved in a discharging operation of liquefied natural gas for storage tanks, and an outline of contents of the discharging operation.

With reference to FIG. 1 to FIG. 8, one embodiment of the present invention will be described. FIG. 1 to FIG. 3 schematically show facility configurations respectively involved in receiving, transferring and discharging operations of liquefied natural gas (LNG) for a plurality of storage tanks 10 for storing LNG for which an operation plan problem is to be solved by a storage tank operation plan deriving system (hereinafter, also referred to as "present system" as appropriate), and outlines of contents of these operation. First, with reference to FIG. 1 to FIG. 3, a brief description of each of the receiving, transferring and discharging operations will be given.

The receiving operation is an operation of receiving LNG of a received cargo transported from a place of production or from other LNG storage base by transportation means 11 such as a LNG tanker, in one or more storage tanks of a plurality of storage tanks 10 that are designated as receiving tanks according to the quantity of load of a received cargo and so on, as shown in FIG. 1. Each reception of LNG is set as a reception plan, and concrete contents thereof including reception quantity, receiving time (reception date), and a reception heat quantity are preliminarily set as reception plan information. The present embodiment assumes the case where part of storage tanks 10 are used as receiving tanks, and for example, in one example shown in FIG. 1, in the situation where storage tanks 10 are dispersedly arranged in two areas A1, A2, four storage tanks K101 to K104 in area A1 and three storage tanks K201 to K203 in area A2 are used as receiving tanks.

The transferring operation is an operation of transferring LNG in one storage tank 10 to another storage tank 10 via a transfer line 12 as shown in FIG. 2, and for example, it is applied for transferring LNG from a receiving tank to other storage tank 10, for example, in the case where part of storage tanks 10 are used as receiving tanks (see FIG. 1). Between storage tank 10 which is to be a transfer source, and transfer line 12, each one transferring pump 13 is interposed. In the example shown in FIG. 2, all receiving tanks are transfer sources, and receiving tanks in area A2 are also transfer destinations. A receiving tank is not necessarily a transfer source. Part of the receiving tanks are set as transfer destinations for allowing more flexible selection of receiving tanks, and for example, it is also useful for adjusting storage quantity of a receiving tank according to a layering determination condition as will be described later.

The discharging operation is an operation of discharging LNG in storage tank 10 to discharge line 14 assigned to each storage tank 10 as shown in FIG. 3. From each discharge line 14, discharged LNG is fed out to a corresponding one or more feeding destinations 15 directly or after being vaporized and subjected to a heat quantity adjustment as is necessary. In the present embodiment, each storage tank 10 is provided with at least two discharging pumps 16, to allow discharge to the same discharge line 14 from different discharging pumps 16 of the same storage tank 10. This makes it possible to use the other pump when one pump trips and becomes unusable. Except for part of storage tanks 10, each discharging pump 16 is connected with at least two discharge lines 14 to allow selective discharge to either one of discharge lines 14. With such a configuration, it is possible to assign each storage tank 10 to each one discharge line 14 by operating one or two discharging pumps 16 for one storage tank 10, so that storage tanks 10 that are discharge sources are grouped for each discharge line 14. In the present embodiment, for each discharge line 14, feed plan quantity of LNG or city gas which is vaporized LNG to corresponding feeding destination 15 per predetermined unit period (for example, one day) is preliminarily set as feed plan information.

In a facility dealing with LNG at extremely low temperatures, cooling for keeping inside the piping cool by conduction of LNG (cooling operation) is conducted for keeping inside the piping through which LNG is to flow in an extremely low temperature condition. In the present embodiment, the cooling is executed by making part of LNG discharged to discharge line 14 (LNG for cooling) flow into transfer line 12 that is to be cooled through a valve, and transferring it to storage tank 10 for recovering the LNG (cooling return tank) (first cooling form). In the present embodiment, transfer line 12 is assumed as an objective to be cooled. Therefore, the cooling can also be regarded as part of the discharging operation or the transferring operation. In the following description, cooling return quantity means an amount (volume) of LNG for cooling flown into transfer line 12 or an amount (volume) of LNG for cooling recovered in the cooling return tank. While the present embodiment assumes the above-described first cooling form, besides the above form, for example, specific receiving tanks may be set as candidates for a cooling supply tank, and LNG for cooling may be taken out of the cooling supply tank selected from the candidates, and recovered in storage tank 10 that is preliminarily set as a cooling return tank through transfer line 12 (second cooling form).

Hereinafter, facilities for reception, transfer and discharge of LNG made up of storage tank 10, transfer line 12, transferring pump 13, discharge line 14, discharging pumps 16 and so on that are exemplarily shown in FIG. 1 to FIG. 3 are referred to as "LNG storage facility group" for convenience.

Next, an operation plan problem for storage tanks 10 that is to be solved by the present system will be described. The present operation plan problem is a mixed-integer non-linear programming problem that is expressed by a large number of continuous variables and discrete variables, a large number of constraints defined by the variables, and one objective function, part of the constraints including a non-linear expression. Given the above-described reception plan information and feed plan information, and tank initial state information including initial storage quantity and initial storage heat quantity of LNG for each storage tank 10 as input information, the present system solves the mixed-integer non-linear programming problem in such a processing procedure as will be described later to derive a reception pattern that prescribes one or more storage tanks 10 that are to receive LNG for each reception plan in a planning period (for example, 30 days), a transfer pattern prescribing specific storage tanks 10 for which transfer of LNG is conducted, a discharge pattern prescribing storage tank 10 that is to conduct discharge of LNG to each discharge line 14 corresponding to the aforementioned feed plan quantity per unit period (for example, one day), a cooling return pattern prescribing a cooling return tank, and transitions of storage quantity and storage heat quantity per unit period (for example, one day) in each storage tank 10, and outputs them in a predetermined format as output information.

Next, major continuous variables, discrete variables, constants, and constraints dealt with in the present operation plan problem will be described. Hereinafter, the unit period is set at one day, a planning period T is set at 30 days, and a point of time t in the planning period T (t=1 to 30) is represented on a daily basis. In the present embodiment, the length of point of time t is a unit period (one day).

FIGS. 4(A) to 4(C) are lists of major continuous variables, major discrete variables, and major constants, respectively. In the lists of FIGS. 4(A) and 4(B), symbols for continuous variables or discrete variables are shown in the left column, and contents thereof are indicated in the right column. In the list of FIG. 4(C), symbols for constants are indicated in the left column, classification numbers are indicated in the middle column, and contents are indicated in the right column.

Dimension of reception quantity, transfer quantity, discharge quantity, BOG generation amount, cooling return quantity, quantity of BOG, and feed plan quantity shown in FIGS. 4(A) and 4(C) is volume (liquid state).

In the present embodiment, any heat quantity of LNG (reception heat quantity, storage heat quantity in storage tank 10, heat quantity in discharge line 14, and so on) is converted into density in liquid state (mass per unit volume). Therefore, any of continuous variables and constants on heat quantity of LNG are used after they are replaced with continuous variables and constants on density. Concretely, replacement can be achieved by converting heat quantity of LNG into heat quantity per unit volume of vaporized gas in standard state [MJ/Nm³] (standard-state heat quantity of vaporization), and approximating one of the standard-state heat quantity of vaporization of LNG and density of LNG (liquid state) by a linear expression of the other. Since density of LNG (liquid state) can be converted into standard-state heat quantity of vaporization of LNG, heat quantity constraint for city gas which is vaporized discharged LNG can be easily replaced with a constraint for density of discharged LNG (liquid state).

Constants classified in classification number 1 shown in the list of FIG. 4(C) are given by input information such as reception plan information and feed plan information. Constants classified in classification number 2 are established based on physical properties of LNG. Constants classified in classification number 3 are established based on attribute information (capacity of storage tank 10, performances of transferring pump 13 and discharging pumps 16, and so on) of various facilities involved in reception, storage, transfer, discharge of LNG such as storage tank 10, transfer line 12, transferring pump 13, discharge line 14, and discharging pumps 16. Constants classified in classification number 4 are established based on a heat quantity constraint for discharged LNG.

Next, constraints will be described. Constraints are defined mainly as material quantity constraints and heat quantity constraints for various facilities in stages of reception, storage, transfer, discharge, and cooling. Material quantity constraints include constraints on volume of LNG, and constraints on possible combinations of storage tank 10, transfer line 12, and discharge line 14 which are objectives of respective operations. Heat quantity constraints are constraints on heat quantity of LNG in respective operation steps, however, in the present embodiment, heat quantity constraints are constraints on density of LNG. Since a constraint on change in mass per day for each storage tank 10 (see mathematical expression 2 below), and a constraint on balance between discharge mass of LNG for each discharge line 14 (product of discharge quantity and density) and discharge mass of LNG to corresponding feeding destination 15 (product of feed plan quantity and density) (see mathematical expression 8 below), and a constraint on mass balance concerning LNG for cooling (see mathematical expression 18 below) also include density, constraints on mass have two aspects of a material quantity constraint and a heat quantity constraint. Since the constraint expression on mass is a polynomial expression of various masses expressed by products of two continuous variables (product of volume and density) (non-linear expression), the mass constraint is a non-linear constraint.

Constraints are also classified according to the kinds of variables contained in the constraint expression. They are classified into three cases: the case where the constraint expression contains only continuous variables but not discrete variables as variables; the contrary case where it contains only discrete variables but not continuous variables; and the case where it contains both continuous variables and discrete variables.

Hereinafter, major constraints will be described. First, constraint expressions on change in volume and change in mass per day for each storage tank 10 are shown in the following mathematical expression 1 to mathematical expression 3. Any of these mathematical expression 1 to mathematical expression 3 are constraints on continuous variables. There are the same number of constraint expressions of mathematical expression 1 to mathematical expression 3 as the number of products of the number of days of planning period T and the number of storage tanks 10.

$$v_j^{t+1} = v_j^t + y_j^t + \sum_i x_{i,j}^t - \quad \text{[Mathematical expression 1]}$$

$$\sum_i x_{j,i}^t - \sum_l z_{j,l}^t + \sum_l xc_{l,j}^t - w_j^t$$

$$q_j^{t+1} \cdot v_j^{t+1} = \quad \text{[Mathematical expression 2]}$$

$$q_j^t \cdot v_j^t + b_t^q \cdot y_j^t + \sum_i q_i^t \cdot x_{i,j}^t - \sum_i q_j^t \cdot x_{j,i}^t -$$

$$\sum_l q_j^t \cdot z_{j,l}^t + \sum_l qc^t \cdot xc_{l,j}^t - qw \cdot w_j^t$$

$$V_j^L \leq v_j^t \leq V_j^U \quad \text{[Mathematical expression 3]}$$

Mathematical expression 1 represents that in storage tank j, an initial storage volume at point of time t changes to an initial storage volume at point of time t+1 through changes in volume by various operations occurring at point of time t and generation of BOG. Concretely, reception quantity, incoming transfer quantity and incoming cooling return quantity at point of time t are added to the initial storage volume at point of time t, and from the sum, outgoing transfer quantity and discharge quantity and BOG generation amount are subtracted to give the initial storage volume at the subsequent point of time t+1. Therefore, the constraint shown in mathematical expression 1 represents a material quantity constraint including every operations of reception, storage, transfer, discharge and cooling. Here, BOG generation amount in the seventh term on the right side of mathematical expression 1 is total quantity of BOG generated in various operations at point of time t, and is determined as BOG generation amount for each operation by using a value in a table preliminarily prepared for each operation for a parameter such as density of BOG at the point of time of the operation.

Mathematical expression 2 represents that in storage tank j, an initial storage mass at point of time t changes to an initial storage mass at point of time t+1 through change in mass by various operations occurring at point of time t and generation of BOG. Concretely, to the initial storage mass (product of storage volume and storage density) at point of time t, reception mass (product of reception quantity and receiving density), incoming transfer mass (transfer quantity and storage density of transfer source tank), and incoming cooling return mass (cooling return quantity and density of cooling return LNG) at point of time t are added, and from the sum, outgoing transfer mass (transfer quantity and storage density), discharge mass (discharge quantity and storage density), and BOG generation mass (BOG generation amount and density of BOG) are subtracted to give the initial storage mass (product of storage volume and storage density) at the subsequent point of time t+1. Here, BOG generation amount in the seventh term on the right side of mathematical expression 2 is determined in a similar manner as in the aforementioned mathematical expression 1. Therefore, the constraints shown in mathematical expression 2 represent material quantity constraints and heat quantity constraints including every operations of reception, storage, transfer, discharge and cooling.

Mathematical expression 3 is a constraint expression defining material quantity constraints in the storage step on upper and lower limits of storage quantity in each storage tank 10, and it concretely defines that storage quantity in each storage tank 10 at point of time t is less than or equal to a volume upper limit, and more than or equal to a volume lower limit that are determined by the storage capacity of each storage tank 10.

Next, constraint expressions related with material quantity constraints in the receiving operation will be shown in the following mathematical expression 4 to mathematical expression 6. Mathematical expression 4 represents a constraint on continuous variables, mathematical expression 5 represents a constraint on a continuous variables and a discrete variable (mixed-integer constraints), and mathematical expression 6 represents a constraint on discrete variables.

$$\sum_j y_j^t = b_t \quad \text{[Mathematical expression 4]}$$

$$y_j^t \leq \delta_j^t \cdot V_j^U \quad \text{[Mathematical expression 5]}$$

$$\delta_{j1}^t + \delta_{j2}^t \leq 1 \quad \text{[Mathematical expression 6]}$$

Mathematical expression 4 represents that reception quantity of the reception plan whose reception date is point of time t is the sum of receiving quantities received in each storage tank 10 at point of time t. Reception quantity of the one that is not used as a receiving tank of storage tanks 10 on the left side of mathematical expression 4 is 0. There are the same number of mathematical expressions 4 as the number of days of planning period T. When there is no reception plan at point of time t, the constant on the right side of mathematical expression 4 is 0.

Mathematical expression 5 represents that reception quantity in storage tank j at point of time t is lower than or equal to the upper limit value for volume of storage tank j when there is reception at point of time t, and is 0 when there is no reception at point of time t. There are the same number of mathematical expressions 5 as the number of products of the number of days of planning period T and the number of storage tanks 10.

Mathematical expression 6 defines combination of storage tanks 10 that cannot be used simultaneously as receiving tanks for one reception plan. In other words, mathematical expression 6 represents that storage tank j1 and storage tank j2 cannot be used as receiving tanks simultaneously. There are the same number of mathematical expressions 6 as the number of combinations of storage tanks 10 that cannot be used simultaneously as receiving tanks.

Next, constraint expressions regarding material quantity constraints in the discharging operation will be shown in the following mathematical expression 7 to mathematical expression 10. Any of these mathematical expression 7 to mathematical expression 10 expresses a constraint on continuous variables. For each of mathematical expression 7 and mathematical expression 8, there are the same number of constraint expressions as the number of products of the number of days of planning period T and the number of discharge lines 14. For mathematical expression 9, there are the same number of constraint expressions as the number of products of the number of days of planning period T and the number of storage tanks 10. For mathematical expression 10, there are the same number of constraint expressions as the number of products of the number of days of planning period T, the number of storage tanks 10 and the number of discharge lines 14.

$$\sum_j z_{j,l}^t = \sum_i xc_{l,i}^t + \sum_{m'} c_{m'}^t - \sum_{m'} mw_{m'}^l \quad \text{[Mathematical expression 7]}$$

$$\sum_j q_j^t \cdot z_{j,l}^t = \quad \text{[Mathematical expression 8]}$$

$$lq_l^t \cdot \left( \sum_i xc_{l,i}^t + \sum_{m'} c_{m'}^t \right) - qw \cdot \sum_{m'} mw_{m'}^l$$

$$\sum_l z_{j,l}^t = \sum_k zp_{k,j}^t \quad \text{[Mathematical expression 9]}$$

$$U_{j,l}^z \geq z_{j,l}^t \quad \text{[Mathematical expression 10]}$$

Mathematical expression 7 defines volume balance between the sum of discharge quantities to discharge line l at point of time t and the feed plan quantity to discharge line l. Concretely, the sum of discharge quantities to discharge line l at point of time t is equal to the volume that is obtained by summing up the sum of cooling return quantities to each storage tank 10 from discharge line l and the sum of feed plan quantities to feeding destination m' (m' represents a feeding destination assigned to discharge line 1) in a feed plan regarding discharge line l at point of time t, and subtracting the sum of BOD quantities mixed into feeding destination m' at point of time t from the summed up result. In the present embodiment, quantity of BOG mixed into each feeding destination 15 in association with the discharging operation is determined by using a value in a table preliminarily prepared for each operation for a parameter such as density of BOG at the point of time of the operation.

Mathematical expression 8 defines mass balance between the sum of discharge masses to discharge line l at point of time t and feed plan mass represented by a product of feed plan quantity of discharge line l and density. Concretely, the sum of products of discharge quantity from each storage tank j to discharge line l and density at point of time t is equal to the mass that is obtained by summing up the sum of cooling return quantities to each storage tank 10 from discharge line l and the sum of feed plan quantities to feeding destination m' (m' represents a feeding destination assigned to discharge line 1) in a feed plan regarding discharge line l at point of time t, and multiplying the resultant sum by density of discharge line l, followed by subtraction of BOG mass that is obtained by multiplying the sum of quantities of BOG mixed into feeding destination m' at point of time t by density of BOG.

Mathematical expression 9 defines that the sum of discharge quantities to discharge lines l from storage tank j at point of time t is the sum of discharge quantities from discharging pump k connected with storage tank j.

Mathematical expression 10 represents that discharge quantity from storage tank j to discharge line l at point of time t is constrained to not more than the upper limit value that is determined by the ability of discharging pump 16 disposed between storage tank j and discharge line l.

Next, constraint expressions regarding heat quantity constraints in the discharging operation will be shown in the following mathematical expression 11 and mathematical expression 12. Any of these mathematical expression 11 and mathematical expression 12 expresses a constraint on continuous variables. For mathematical expression 11, there are the same number of constraint expressions as the number of discharge lines 14, and for mathematical expression 12, there are the same number of constraint expressions as the number of products of the number of days of planning period T and the number of discharge lines 14.

$$\frac{\sum_t lq_l^t}{T} \leq A_l \qquad \text{[Mathematical expression 11]}$$

$$B_l^L \leq lq_l^t \leq B_l^U \qquad \text{[Mathematical expression 12]}$$

Mathematical expression 11 defines that average density in planning period T of density in each discharge line l at point of time t is more than or equal to the lower limit value for average density of each discharge line l.

Mathematical expression 12 defines that density of each discharge line 1 at point of time t is more than or equal to the lower limit value and less than or equal to the upper limit value for instant density of each discharge line l. In the present embodiment, the unit period is assumed as one day, and the lower limit value and the upper limit value for instant heat quantity define an acceptable variation range of density per hour. In other words, mathematical expression 12 also defines that density of each discharge line l defined on a daily basis falls within an acceptable variation range of density per hour.

Next, constraint expressions regarding material quantity constraints in the transferring operation will be shown in the following mathematical expression 13 to mathematical expression 16. Mathematical expression 13 expresses a constraint on continuous variables. Any of mathematical expression 14 to mathematical expression 16 expresses a constraint on discrete variables. For mathematical expression 13, there are the same number of constraint expressions as the number of products of the number of days of planning period T, the number of storage tanks 10, and the number of storage tanks 10 minus one. For each of mathematical expression 14 to mathematical expression 16, there are the same number of constraint expressions as the number of products of the number of days of planning period T and the number of storage tanks 10.

$$U_{i,j}^x \geq x_{i,j}^t \qquad \text{[Mathematical expression 13]}$$

$$\sum_i ix_{j,i}^t \leq 1 \qquad \text{[Mathematical expression 14]}$$

$$\sum_i ix_{i,j}^t \leq 1 \qquad \text{[Mathematical expression 15]}$$

$$\sum_i ix_{i,j}^t + \sum_i ix_{j,i}^t \leq 1 \qquad \text{[Mathematical expression 16]}$$

Mathematical expression 13 represents that transfer quantity from storage tank i to storage tank j at point of time t is constrained to not more than the upper limit value determined by the ability of transferring pump 13 disposed in storage tank i.

Mathematical expression 14 defines that plural storage tanks 10 will not be transfer destinations at the same point of time t in the transferring operation at point of time t. The value on the left side of mathematical expression 14 is 0 when transfer from storage tank j as a transfer source is not conducted at point of time t, and is 1 when it is conducted.

Mathematical expression 15 defines that plural storage tanks 10 will not be transfer sources at the same point of time t in the transferring operation at point of time t. The value on the left side of mathematical expression 15 is 0 when transfer to storage tank j as a transfer destination is not conducted at point of time t, and is 1 when it is conducted.

Mathematical expression 16 defines that the same storage tank 10 of plural storage tanks 10 will not be a transfer destination and a transfer source simultaneously in the transferring operation at point of time t. The value on the left side of mathematical expression 16 is 0 when transfer wherein storage tank j is a transfer destination or a transfer source is not conducted at point of time t, and is 1 when it is conducted.

Next, constraint expressions regarding material quantity constraints in the cooling operation will be shown in the following mathematical expression 17 and mathematical expression 18. Any of these mathematical expression 17 and mathematical expression 18 expresses a constraint on continuous variables. For each of mathematical expression 17 and mathematical expression 18, there are the same number of constraint expressions as the number of products of the number of days of planning period T and the number of discharge lines 14.

$$\sum_j xc_{l,j}^t = cl_l^t \qquad \text{[Mathematical expression 17]}$$

$$qc^t \sum_l cl_l^t = \sum_l lq_l^t \cdot cl_l^t \qquad \text{[Mathematical expression 18]}$$

Mathematical expression 17 defines volume balance regarding LNG for cooling provided via discharge line l at point of time t. Concretely, the sum of cooling return quantity to each storage tank j from discharge line l at point of time t is equal to cooling return quantity to a predetermined transfer line 12 from discharge line l at point of time t.

Mathematical expression 18 defines mass balance regarding LNG for cooling at point of time t. Concretely, the product of the sum of cooling return quantity to the predetermined transfer line 12 from each discharge line 14 at point of time t and density of cooling return LNG is equal to the sum of products of cooling return quantity to the predetermined transfer line 12 from discharge line l at point of time t and density of discharge line l.

For major constraints, detailed descriptions have been given while they are classified into material quantity constraints and heat quantity constraints in each step of reception, storage, transfer, discharge and cooling. Hereinafter, for convenience of explanation, constraints that define volume change and volume balance as shown in mathematical expression 1, mathematical expression 7 and mathematical expression 17 are referred to as "volume conservation law", and constraints that define mass change and mass balance as shown in mathematical expression 2, mathematical expression 8 and mathematical expression 18 are referred to as "mass conservation law". Since constraints significantly rely on configuration and the number of individual constituents and attributes (size, performance and so on) of individual constituents in the LNG storage facility group which are bases of the mixed-integer non-linear programming problem to be solved by the present system, other constraints may be established in addition to the major constraints exemplified in mathematical expression 1 to mathematical expression 18. Further, part of the major constraints may be changed to other constraints.

As one example of constraint in the case of making LNG flow into storage tank 10 by reception, transfer or cooling, such a constraint can be recited that determines an inlet of LNG either in an upper part of the tank or in an a lower part of the tank based on the relation between storage quantity of storage tank 10 and density difference between incoming LNG and stored LNG. This is a constraint (layering determination condition) regarding heat quantity constraint for preventing occurrence of layering inside storage tank 10 due to density distribution of LNG by the aforementioned relation. The constraint can be changed, for example, to such a constraint of preliminarily setting the storage quantity of a receiving tank that receives LNG through an inlet located in an upper part of the tank at the storage quantity for an inlet located in a lower part the tank, for example in the case of conducting an operation of unifying the location of inlets of LNG in lower parts of tanks when plural receiving tanks are used. In any case, a variable that determines whether the inlet of LNG of storage tank 10 is located in an upper part of the tank or in a lower part of the tank is a discrete variable. For example, in the case where it is necessary to unify the location of inlets of LNG either in an upper part of the tank or in a lower part of the tank when plural storage tanks 10 are objectives for reception, the constraint is a constraint using this discrete variable.

As other one example, to the constraints regarding material quantity constraints in the receiving operation, for example, a constraint defining that difference in the tank liquid level that is determined by each storage quantity before reception is in a predetermined range between receiving tanks when there are plural receiving tanks, a constraint defining that difference in the tank liquid level that is determined by each storage quantity after reception is equivalent between receiving tanks when there are plural receiving tanks, a constraint defining that a ratio of reception quantity between receiving tanks is a predetermined ratio when there are plural receiving tanks, and a constraint defining that the number of receiving tanks is determined by reception quantity of a reception plan may be added.

As other one example, as constraints regarding material quantity constraints in the discharging operation, for example, a constraint defining that the correspondence relation between discharging pump 16 and discharge line 14 is fixed for a certain period without being changed, and a constraint defining that the number of discharging pumps 16 to be operated for each discharge line 14 is set at one larger than the necessary number determined by feed plan quantity for each discharge line 14 may be added. In the former constraint, each of the correspondence relation between discharging pump 16 and discharge line 14, and the certain period for which the correspondence relation is fixed may be configured to be appropriately changeable as part of input information.

As other one example, as constraints regarding heat quantity constraints in the discharging operation, for example, a constraint defining that constraints shown in mathematical expression 11 and mathematical expression 12 are satisfied even when one of discharging pumps 16 trips, a constraint defining that density in storage tank 10 which is a discharge source before activation of discharging pump 16 is within a predetermined range, a constraint defining that an adding amount of LPG (liquefied petroleum gas) to be added for adjusting heat quantity of LNG to be fed to feeding destination 15 from discharge line 14 is not more than a predetermined upper limit value, and a constraint defining that BOG quantity mixed into LNG that is to be fed from discharge line 14 to feeding destination 15 is not more than a predetermined upper limit value may be added.

As other one example, as constraints regarding material quantity constraints in the transferring operation, for example, a constraint defining that for each transfer line 12, storage tank 10 that is to be a transfer source and storage tank 10 that is to be a transfer destination are fixed to specific storage tanks 10, a constraint defining that when the receiving operation is conducted in a certain area, the transferring operation is not conducted within the same area, and a constraint defining that storage quantity or a liquid level in storage tank 10 that is to be a transfer source before activation of transferring pump 13 is in a predetermined range may be added.

As other one example, as constraints regarding material quantity constraints in cooling, for example, a constraint defining that the possible combination of discharge line 14 that is to be a feeding source of LNG for cooling and a cooling return tank is preliminarily fixed to a predetermined combination for each transfer line 12 may be added.

Figure 5:
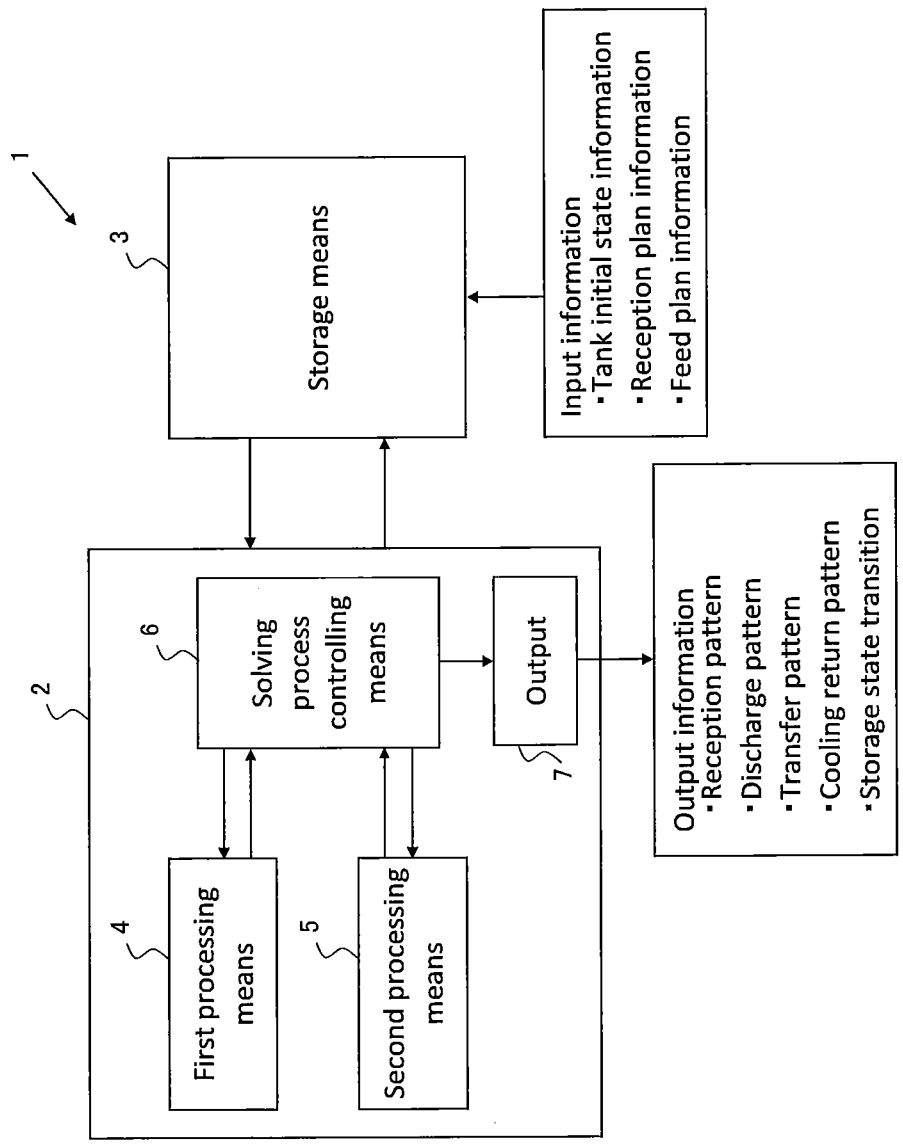
FIG. 5 is a block diagram schematically showing an outline configuration of a storage tank operation plan driving system according to the present invention.

Next, configuration of the present system will be described. FIG. 5 shows the outline configuration of the present system 1. As shown in FIG. 5, the present system 1 has arithmetic processing means 2 for solving a mixed-integer non-linear programming problem in the later-described processing procedure, and storage means 3 for storing the processing procedure, the above-described constraints and objective functions, input information including the above-described reception plan information, feed plan information and tank initial state information, the above-described tables defining BOG generation amount and so on. The above-described continuous variables, discrete variables, and constants classified into classification numbers 2 to 4 are stored as part of constraints, and constants classified in classification number 1 are stored as part of input information in storage means 3.

Arithmetic processing means 2 does not have a general-purpose solver that directly solves a mixed-integer non-linear programming problem, but has first processing means 4 that is a general-purpose solver for solving mixed-integer linear programming problems and second processing means 5 that is a general-purpose solver for solving continuous non-linear programming problems. First processing means 4 solves mixed-integer linear programming problems and integer programming problems using solution algorithms based on a branch and bound method. Second processing means 5 solves continuous non-linear programming problems using solution algorithms based on an interior point method. First processing means 4 and second processing means 5 are software means that operates on a predetermined platform, and are implemented by respective execution programs of these processing means loaded on the memory constituting the platform. Hereinafter, for the sake of convenience, solving processes executed by first processing means 4 are collectively called "first solving process", and solving processes executed by second processing means 5 are collectively called "second solving process".

Arithmetic processing means 2 also functions as solving process controlling means 6 that sequentially selects either one of first processing means 4 and second processing means 5 in a processing procedure as will be described later, and selectively executes the first solving process or the second solving process, and also functions as output means 7 that conducts output processes (screen display, print output, and so on) of output information such as a finally derived reception pattern, transfer pattern, discharge pattern, cooling return pattern, and transition of storage quantity and storage density per day in each storage tank 10 (hereinafter, referred to as "storage state transition" for convenience). Therefore, in the present embodiment, first processing means 4, second processing means 5, and solving process controlling means 6 co-operate to function as a dedicated solver for solving a mixed-integer non-linear programming problem of an operation plan problem for storage tanks 10.

Arithmetic processing means 2 is configured as the aforementioned platform, for example, by using a general-purpose computer such as a personal computer or an engineering work station equipped with a high-performance central processing unit (e.g., Intel Core i5) that operates on generally available OS (operating system). First processing means 4, second processing means 5, and solving process controlling means 6, and output means 7 may be configured on the common platform, or may be configured on individual platforms. Also as will be described later, since the first solving process executed by first processing means 4 and the second solving process executed by second processing means 5 are not executed simultaneously, first processing means 4 and second processing means 5 may be configured on the common platform. The platform on which first processing means 4 and second processing means 5 are configured, and the platform on which solving process controlling means 6 and output means 7 are configured are not necessarily computers having the same architecture, and as the platform on which first processing means 4 and second processing means 5 are configured, a dedicated computer specified for the solution algorithms of first processing means 4 and second processing means 5 may be used.

Storage means 3 is implemented, for example, by a non-volatile storage such as a hard disk storage attached to the aforementioned platform, or a non-volatile storage such as an external hard disk provided separately from the aforementioned platform. Storage means 3 is not necessarily configured by the same storage in terms of hardware configuration, and for example, a storage area storing the aforementioned input information such as reception plan information, feed plan information and tank initial state information and a storage area storing information other than the input information may realized by different storages. Further, the aforementioned processing procedure is preferably stored in a storage attached to the platform on which solving process controlling means 6 is configured.

Figure 6:
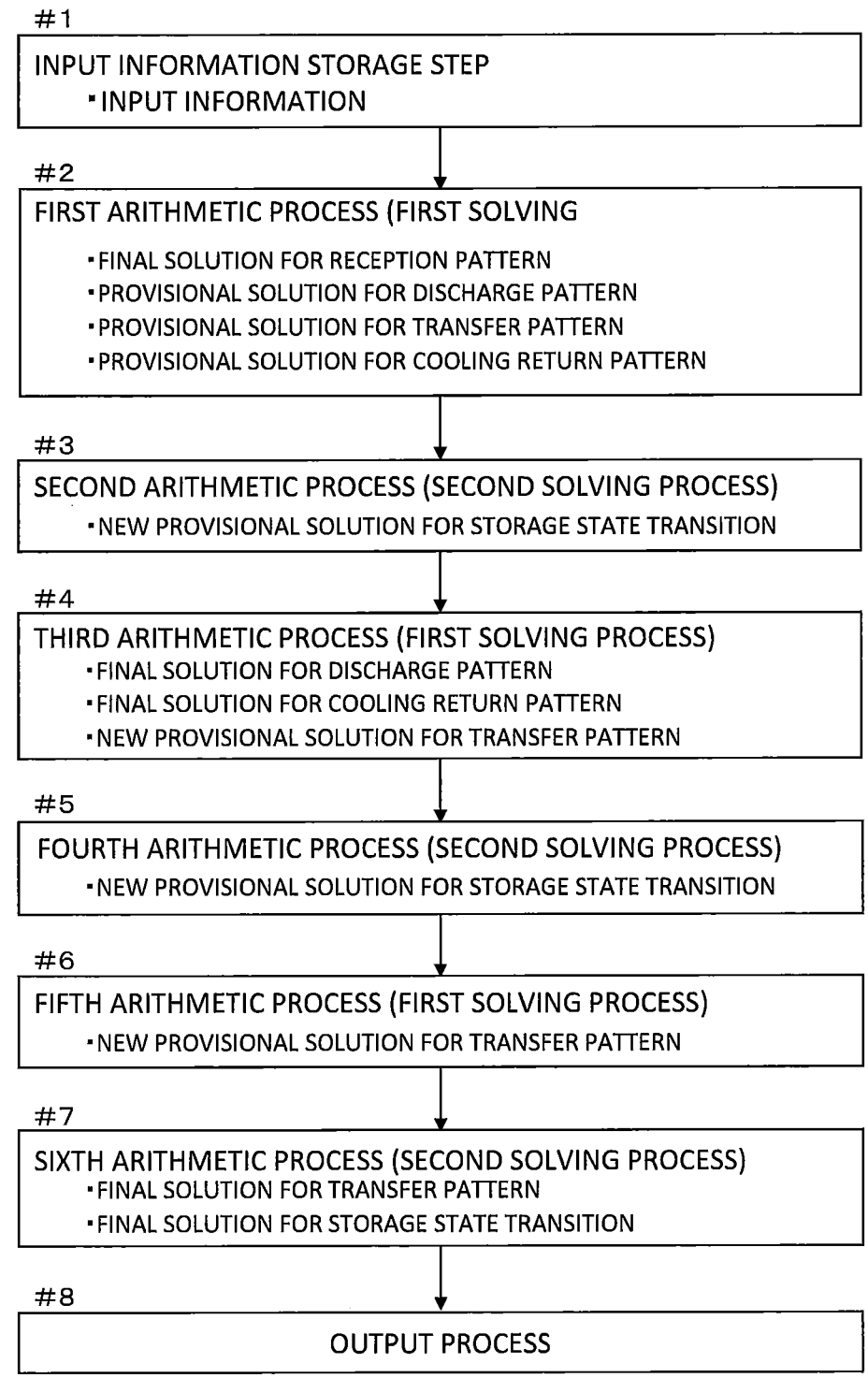
FIG. 6 is a flowchart showing a procedure of processes for solving a storage tank operation plan problem.

Next, referring to the flowchart of FIG. 6, a method for solving the aforementioned operation plan problem to derive an operation plan for storage tanks 10 using the present system 1 will be described.

First, in step #1, input information of reception plan information, feed plan information and tank initial state information accepted through an entry operation by an operator is inputted and saved in storage means 3 (input information storage step).

The reception plan information is information on supply of LNG in planning period T, and is composed of, for example, identification information of the reception plan, arrival date of LNG tanker (reception date), LNG reception quantity, density of LNG (or standard-state heat quantity of vaporization) and so on for each reception plan occurring in planning period T. In the present embodiment, since standard-state heat quantity of vaporization of LNG is converted into density as described above, when input of the heat quantity by an entry operation by an operator is accepted, arithmetic processing means 2 converts the heat quantity to density before inputting it to storage means 3.

The feed plan information is established based on estimated demand of LNG for each feeding destination 15, and is composed of feed plan quantity per day of LNG or a city gas which is vaporized LNG to each feeding destination 15 in planning period T. In the present embodiment, the feed plan quantity is represented in volume of LNG (liquid state).

The tank initial state information is composed of initial values of volume and density of LNG that is stored in each storage tank 10 directly before the start of planning period T, and initial values of volume and density respectively correspond to initial storage quantity and initial storage heat quantity. The tank initial state information is inputted into storage means 3 automatically or by manual operation by an operator upon acquirement of measurement results from a liquid scale and a mass scale provided for each storage tank 10.

Storage means 3 preliminarily stores the aforementioned constraints, continuous variables, discrete variables, and constants forming the operation plan problem that is to be solved, prior to input information storage step. When the operation plan problem that is to be solved is changed, or in other words, when the objective LNG storage facility group is different, constraints, continuous variables, discrete variables, constants and so on are reset.

Next, in step #2 and subsequent steps, an arithmetic processing step is executed according to a processing procedure controlled by solving process controlling means 6, on the basis of input information inputted in step #1 and stored in storage means 3.

In step #2, for example, arithmetic processing means 2 linearly approximates a non-linear expression in a non-linear constraint in constraints on reception and storage and part of constraints on transfer, discharge and cooling which are objectives to be considered among the aforementioned constraints without considering the remaining part of constraints on transfer, discharge and cooling, replaces the operation plan problem represented by a mixed-integer non-linear programming problem with a mixed-integer linear programming problem without considering non-linear constraints contained in constraints that are not objectives to be considered, and solves the mixed-integer linear programming problem by using first processing means 4 to derive a reception pattern, a discharge pattern, a transfer pattern, a cooling return pattern, and storage state transition as feasible solutions that satisfy the constraints selected as objectives to be considered and minimize the following objective function (first arithmetic process). In the present embodiment, by the first arithmetic process, a final solution for the reception pattern, and provisional solutions for the discharge pattern, the transfer pattern, the cooling return pattern, and the storage state transition are obtained. Therefore, as the constraint that is excluded from objectives to be considered, the constraint that will not largely influence on deriving of a final solution for the reception pattern is selected. Which constraint is to be concretely excluded depends on the configuration and the number of individual constituents and attributes (size, performance and so on) of individual constituents in the LNG storage facility group, and among the constraints on transfer, for example, the constraint defining that storage tank 10 that is to be a transfer source and storage tank 10 that is to be a transfer destination are fixed to specific storage tanks 10 for each transfer line 12 is preferably selected as an objective to be considered. Among the constraints on discharge, for example, it is preferred to consider all constraints regarding material quantity constraints and to exclude part of constraints regarding heat quantity constraints from objectives to be considered.

First processing means 4 solves the first solving processes of the first arithmetic process, the later-described third arithmetic process and fifth arithmetic process by using solution algorithms based on a well-known branch and bound method. Since concrete contents of the first solving process is not the gist of the present invention, detailed description of the concrete contents thereof will be omitted.

In the first arithmetic process, the constraints that are objectives for linear approximation are constraints on mass of LNG shown in mathematical expression 2 and mathematical expression 8 as described above (mass conservation law). A non-linear expression expressed as a product of density variable q and volume variable v in each term on the left side and the right side of mathematical expression 2 and mathematical expression 8 can be approximated to a linear expression shown on the right side of the following mathematical expression 19. The symbols q and v for density variable q and volume variable v are expedient representatives of respective density variables and respective volume variables in mathematical expression 2 and mathematical expression 8.

$$q \cdot v = q0 \cdot v + q \cdot v0 - q0 \cdot v0 \quad \text{[Mathematical expression 19]}$$

The symbols q0 and v0 on the right side of mathematical expression 19 are constants, and represent standard density and standard volume, respectively. By assuming that variance of density variable q from the standard density and variance of volume variable v from the standard volume are small, a product of these two variances can be approximately ignored.

In the present embodiment, as an objective function, objective function F shown in the following mathematical expression 20 is used. In mathematical expression 20, Pi denotes penalty represented by deviation of a predetermined item that is to be monitored from a predetermined standard value, and Ai denotes a weight coefficient for weighted summing of penalty Pi. Examples of items to be monitored include continuous variables whose variation ranges are restricted in the aforementioned constraints, for example, continuous variables in constraints expressed as inequalities, and functions expressed by either or both of continuous variables and discrete variables of the constraint expressions exemplarily shown in the aforementioned mathematical expression 1 to mathematical expression 18. As examples of items to be monitored, average density in planning period T of density at point of time t of each discharge line 14, density at each point of time t of each discharge line 14, the number of transfers occurring in planning period T, and the sum of transfer quantities in planning period T are conceivable. However, since part of constraints on transfer and discharge and constraints on cooling are not considered in the first arithmetic process in step #2, weight coefficients of penalty regarding these constraints may be set at 0 or a value smaller than others.

$$F = \sum_i A_i \cdot P_i \quad \text{[Mathematical expression 20]}$$

In step #3, arithmetic processing means 2 replaces the operation plan problem expressed as a mixed-integer non-linear programming problem with a continuous non-linear programming problem by fixing every reception pattern and discrete variable by using the result obtained in the first arithmetic process in step #2, and solves the continuous non-linear programming problem by using second processing means 5 to derive new provisional solutions for storage state transition as feasible solutions that satisfy the constraints selected as objectives to be considered and minimize the objective function of mathematical expression 20 (second arithmetic process). In the second arithmetic process, constraints containing non-linear expressions are used as they are without being linearly approximated, and further, part of constraints that are excluded from objectives to be considered in the first arithmetic process, for example, constraints on discharge are added as objectives to be considered. As a result, in the second arithmetic process, provisional solutions having higher accuracy than the provisional solutions for storage state transition obtained in the first arithmetic process are obtained. It should be noted that in the second arithmetic process, weight coefficient Ai in the objective function of mathematical expression 20 may be changed from that in the first arithmetic process depending on the constraints that are to be considered.

While the second processing means 5 solves the second solving processes of the second arithmetic process, the later-described fourth arithmetic process and sixth arithmetic process using solution algorithms based on a well-known interior point method, detailed description of concrete contents of the second solving process will be omitted because it is not the gist of the present invention.

In step #4, arithmetic processing means 2 replaces the operation plan problem expressed as a mixed-integer non-linear programming problem with a mixed-integer linear programming problem, by linearly approximating a non-linear expression in a non-linear constraint containing the non-linear expression, of the constraints which are objectives to be considered by using the results obtained in the first and the second arithmetic processes in step #2 to step #3, and solves the mixed-integer linear programming problem by using first processing means 4 to derive final solutions for the discharge pattern and the cooling return pattern and a new provisional solution for the transfer pattern as feasible solutions that satisfy the constraints selected as objectives to be considered and minimize the function of mathematical expression 20 (third arithmetic process). In the third arithmetic process, for the purpose of obtaining final solutions for the discharge pattern and the cooling return pattern, every constraint on discharge and cooling is considered, and instead, part of constraints on transfer that are considered in the second arithmetic process are excluded from objectives, and thus the constraints which are objectives to be considered are coordinated to relax the mixed-integer linear programming problem. In the third arithmetic process, since provisional solutions for storage state transition having higher accuracy than those obtained in the second arithmetic process are used, it is possible to obtain final solutions for the discharge pattern and the cooling return pattern accurately, and the provisional solutions for the transfer pattern also have higher accuracy than in the first arithmetic process. It should be noted that in the third arithmetic process, weight coefficient Ai in the objective function of mathematical expression 20 may be changed from that in the second arithmetic process depending on the constraints that are to be considered.

In step #5, arithmetic processing means 2 replaces the operation plan problem expressed as a mixed-integer non-linear programming problem with a continuous non-linear programming problem by fixing every reception pattern, discharge pattern, cooling return pattern and discrete variable by using the results obtained in the first to third arithmetic processes in step #2 to step #4, and solves the continuous non-linear programming problem by using second processing means 5 to derive new provisional solutions for storage state transition as feasible solutions that satisfy the constraint selected as objectives to be considered, and minimize the objective function of mathematical expression 20 (fourth arithmetic process). In the fourth arithmetic process, a constraint containing a non-linear expression is not linearly approximated, but is used in the form of the non-linear expression, and part of constraints that are excluded from objectives to be considered in the third arithmetic process are added as objectives to be considered. As a result, in the fourth arithmetic process, a provisional solution having higher accuracy than the provisional solution for storage state transition obtained in the second arithmetic process is obtained. It should be noted that in the fourth arithmetic process, weight coefficient Ai in the objective function of mathematical expression 20 may be changed from that in the third arithmetic process depending on the constraints that are to be considered.

In step #6, arithmetic processing means 2 replaces the operation plan problem expressed as a mixed-integer non-linear programming problem with a mixed-integer linear programming problem by linear-approximating a non-linear expression in a non-linear constraint containing the non-linear expression, of the constraints which are objectives to be considered by using the results obtained in the first, third and fourth arithmetic processes in step #2, step #4 and step #5, and solves the mixed-integer linear programming problem by using first processing means 4 to derive a new provisional solution for the transfer pattern as a feasible solution that satisfies the constraints selected as objectives to be considered, and minimize the function of mathematical expression 20 (fifth arithmetic process). In the fifth arithmetic process, every constraint on transfer is selected as objectives to be considered for obtaining a new provisional solution for the transfer pattern. In step #6, since final solutions have been already obtained except for the transfer pattern and the storage state transition, the mixed-integer linear programming problem that is an objective to be solved is significantly relaxed. Also in the fifth arithmetic process, weight coefficient Ai in the objective function of mathematical expression 20 may be changed from that in the fourth arithmetic process depending on the constraints that are to be considered. In the fifth arithmetic process, since the provisional solutions for storage state transition having higher accuracy than those obtained in the fourth arithmetic process are used, it is possible to obtain the new provisional solution for the transfer pattern accurately.

In step #7, arithmetic processing means 2 replaces the operation plan problem expressed as a mixed-integer non-linear programming problem with a continuous non-linear programming problem by fixing every reception pattern, discharge pattern, cooling return pattern and discrete variable by using the results obtained in the first, and third to fifth arithmetic processes in step #2, step #4 to step #6, and solves the continuous non-linear programming problem by using second processing means 5 to derive final solutions for the transfer pattern and the storage state transition as feasible solutions that satisfy the constraints selected as objectives to be considered, and minimize the objective function of mathematical expression 20 (sixth arithmetic process). In the sixth arithmetic process, a constraint containing a non-linear expression is not linearly approximated, but is used in the form of the non-linear expression. As a result, in the sixth arithmetic process, final solutions for storage state transition having higher accuracy than the provisional solutions for storage state transition obtained in the fourth arithmetic process are obtained, and further, a final solution for the transfer pattern is obtained. It should be noted that in the sixth arithmetic process, weight coefficient Ai in the objective function of mathematical expression 20 may be changed from that in the fifth arithmetic process depending on the constraints that are to be considered.

Next, in step #8, the final solutions for the reception pattern, the discharge pattern, the cooling return pattern, the transfer pattern, and the storage state transition obtained through the respective processes in the aforementioned step #1 to step #7 are displayed on a screen or print outputted in respective predetermined output formats.

A screen display example in a tabular form of the reception pattern, the cooling return pattern, and the transfer pattern is shown in FIG. 7. In the display example shown in FIG. 7, a table of 14 rows×30 columns is prepared by arranging storage tanks K101 to K108, and K201 to K206 respectively of two areas A1 and A2 in the first to 14th rows, and arranging point of time t (t=1 to 30) in planning period T of 30 days in the first to 30th columns on a daily basis, and the reception pattern, the cooling return pattern, and the transfer pattern are shown in the table.

As to the reception pattern, when a certain tank serves as a receiving tank at a specific point of time t among the storage tanks 10, the intersection of the row indicating the storage tank 10 and the column indicating the specific point of time t is marked with a sign (for example, o) indicating that the tank serves as a receiving tank. In the example shown in FIG. 7, for example, it can be seen that storage tanks K201 and K203 serve as receiving tanks at point of time t=1, and storage tanks K102, K103 and K104 serve as receiving tanks at point of time t=3. In an actual receiving operation, according to the reception pattern, LNG of the reception quantity designated by the reception plan is received in the selected receiving tank at each point of time t. When plural receiving tanks are selected, the reception quantity designated by the reception plan is received while it is distributed among the receiving tanks at a predetermined ratio of reception quantity (for example, equal percentages).

As to the cooling return pattern, when a certain tank serves as a cooling return tank at a specific point of time t among storage tanks 10, the intersection of the row indicating the storage tank 10 and the column indicating the specific point of time t is marked with a sign (for example, ▲) indicating that the tank serves as a cooling return tank. In the example shown in FIG. 7, for example, it can be seen that storage tanks K107 and K205 serve as cooling return tanks at point of time t=1 to 15, and storage tanks K108 and K204 serve as cooling return tanks at point of time t=16 to 30.

As to the transfer pattern, when a certain tank serves as a transfer source tank at a specific point of time t among storage tanks 10, the intersection of the row indicating the storage tank 10 and the column indicating the specific point of time t is filled with the number of destination tank. In the example shown in FIG. 7, for example, it can be seen that transfer from storage tank K103 to storage tank K204 and transfer from storage tank K104 to storage tank K206 are conducted at point of time t=2, and transfer from storage tank K104 to storage tank K108 is conducted at point of time t=4.

A screen display example in a tabular form of the discharge pattern is shown in FIG. 8. In the display example shown in FIG. 8, as a discharge pattern for certain one discharge line 14, point of time t (t=1 to 30) in planning period T of 30 days are arranged on a daily basis in the first to 30th rows, and the numbers of storage tanks 10 subjected to discharge at corresponding respective point of time t are listed in each row. In the example shown in FIG. 8, for example, storage tanks K103, K104, K106, K107 serve as storage tanks 10 that are discharge sources at point of time t=1. In an actual discharging operation, according to the discharge pattern, from storage tanks 10 that are selected discharge sources, discharging pump 16 that is ready for discharge to the one discharge line 14 at each point of time t is caused to operate, for example, at equal load or at a discharge quantity ratio in proportion to the pump ability depending on the feed plan quantity to execute discharge of LNG. The discharge pattern is derived so that even if one of the discharging pumps 16 that is ready for discharge trips, the feed plan quantity can be compensated by the remaining discharging pump 16.

As to display of the storage state transition, storage quantity of each storage tank 10 is displayed for each storage tank 10 as a line graph plotting transition of storage quantity (or tank liquid level) per day at point of time t on the horizontal axis, along the vertical axis. In the graph, an upper limit value and a lower limit value for storage quantity of each storage tank 10 is displayed for reference. It should be noted that in the present embodiment, storage density of each storage tank 10 in storage state transition is not displayed, but heat quantity transition per day of each discharge line 14 determined by the storage density and the discharge pattern is displayed by a line graph plotting heat quantity at point of time t on the horizontal axis for each discharge line 14, along the vertical axis. In the graph of heat quantity transition, an upper limit value and a lower limit value used in a constraint, and a legal upper limit value and a legal lower limit value are displayed for reference.

For confirming the utility of the storage tank operation plan deriving system and method as described in detail in the above, an operation plan problem which is the aforementioned mixed-integer non-linear programming problem was solved for the operations of reception, transfer, discharge and cooling that had been actually conducted for the LNG tanks under practical operation by the applicant of the present invention by using the same input information, and a feasible solution was obtained. Further, a result requiring a smaller cost for transfer and smaller deviation from the standard heat quantity of feeding heat quantity compared with the results in actual operation was obtained. When a notebook personal computer equipped with Intel Core i5 processor (operating frequency 2.4 GHz) and memory of 4 GB was used as the platform of present system 1, the solving process for the aforementioned operation plan problem of planning period T of 30 days completed in about 15 minutes despite the huge total number of variables in the order of several tens of thousands.

In the following, modified examples of the aforementioned embodiment will be described as other embodiments.

<1> In the aforementioned embodiment, the case where reception is conducted by part of storage tanks 10 as shown in FIG. 1, and LNG in a receiving tank is transferred to other storage tank 10 via transfer line 12 as shown in FIG. 2 is assumed. However, in the case where receiving is conducted in every storage tank 10, and LNG is not transferred between storage tanks 10 via transfer line 12, or in the case where the transferring operation is conducted in a preliminarily fixed transfer pattern, the fifth and the sixth arithmetic processes in the aforementioned steps #6 and step #7 are no longer required. Therefore, in the output process in step #8, screen display of transfer pattern and so on is not conducted. In the case where the transferring operation is conducted in a preliminarily fixed transfer pattern, a discrete variable that defines the transfer pattern is a constant.

<2> In the aforementioned embodiment, the case where the aforementioned first cooling form is assumed in the operation plan problem to be solved by the present system 1, and the cooling return pattern is derived. However, when the aforementioned second cooling form is assumed in place of the first cooling form, the cooling supply pattern that prescribes a cooling supply tank is derived in place of the cooling return pattern. When the aforementioned first cooling form and second cooling form are assumed, both the cooling return pattern and the cooling supply pattern are derived. When the second cooling form is employed, it is preferred to additionally use a continuous variable that defines a cooling supply quantity likewise cooling return quantity.

Also in the case where the cooling is targeted to specific receiving tanks as candidates for a cooling supply tank, and LNG for cooling is taken out from the cooling supply tank that is selected from the candidates, and recovered in a cooling return tank selected from storage tanks 10 through transfer line 12, a cooling pattern including both the cooling return pattern and the cooling supply pattern is derived. In this case, since the cooling pattern resembles the transfer pattern, it is preferred to additionally provide a variable likewise a discrete variable that defines the transfer pattern.

Further, as shown in the aforementioned <1>, in the case where the transferring operation is not conducted, transfer line 12 is no longer required, and it is no longer necessary to consider transfer line 12 as an objective for cooling in the operation plan problem to be solved by the present system 1, and hence in this case, it is not necessary to derive any of the cooling return pattern and the cooling supply pattern. Further, even in the case where there is transfer line 12 and cooling is conducted, when either one of the cooling supply pattern and the cooling supply pattern is fixed in operation, it is not necessary to derive the fixed one of the cooling return pattern and the cooling supply pattern.

<3> In the aforementioned embodiment, the case where storage tanks 10 are dispersedly installed in two areas A1, A2 is assumed, however, in the case where storage tanks 10 are arranged dispersedly in two or more areas, and there are a large number of candidates for a receiving tank in each area, a preliminary arithmetic process for provisionally determining only the area of the receiving tank may be added before the first arithmetic process in the aforementioned step #2. In this case, the preliminarily arithmetic process replaces the operation plan problem expressed as a mixed-integer non-linear programming problem with a mixed-integer linear programming problem or an integer programming problem, and solves the mixed-integer linear programming problem by using first processing means 4 to derive a reception pattern, a discharge pattern, a transfer pattern, a cooling return pattern, and storage state transition as feasible solutions that satisfy the constraint selected as an objective to be considered, and minimize the objective function of mathematical expression 20. However, any non-linear constraints of the constraints that are objectives to be considered in the first arithmetic process are excluded from objectives to be considered, and for other constraints that are objectives to be considered in first arithmetic process, relaxation or simplification is conducted on part of constraints on reception and storage. The reception area is fixed by the reception pattern obtained by the preliminary arithmetic process, and by using the provisional solution for storage state transition, linear approximation of non-linear constraints in the first arithmetic process is conducted. As a result, it is possible to further increase the accuracy of the first arithmetic process, for example, in the case where the number of storage tanks 10 or the number of areas is large.

<4> While the aforementioned embodiment describes the case where a final solution for the discharge pattern for every discharge line 14 is derived through the third arithmetic process in the aforementioned step #4, at least one first solving process and at least one second solving process may be executed as pre-processings for the third arithmetic process prior to the third arithmetic process, and then the third arithmetic process reflecting he results of these first and second solving processes may be executed.

For example, in the case where plural discharge lines 14 are sectioned in correspondence with areas A1, A2 as shown in FIG. 3, it is also preferred to group discharge patterns of discharge lines 14 according to the area, and execute, prior to the third arithmetic process in the aforementioned step #4, a first solving process for deriving final solutions for discharge patterns of discharge lines 14 corresponding to one reception area, and provisional solutions for the remaining discharge patterns, transfer pattern, and cooling return pattern (first pre-processing for the third arithmetic process); and a second solving process for deriving a new provisional solution for storage state transition by fixing the reception pattern, the part of discharge patterns and every discrete variable, by using the result obtained in the first arithmetic process in step #2 (final solution for the reception pattern) and the result obtained in the first pre-processing for the third arithmetic process (final solutions for part of discharge patterns and provisional solutions for the remaining discharge patterns, transfer pattern, and cooling return pattern) (second pre-processing for the third arithmetic process), and conduct the third arithmetic process in the aforementioned step #4 using the final solutions and the provisional solutions derived in the first and the second pre-processings for the third arithmetic process in place of the provisional solutions derived in the first and the second arithmetic processes.

Further, after the second pre-processing for the third arithmetic process, an additional first solving process or second solving process may be executed, and then the third arithmetic process reflecting the result of the first or second solving process may be executed. Also, final solutions for discharge patterns for each area may be sequentially derived when the number of areas is 3 or more.

<5> While the aforementioned embodiment describes the case where a final solution for the transfer pattern is derived through the fifth arithmetic process in the aforementioned step #6, at least one first solving process and at least one second solving process may be executed as pre-processings for the fifth arithmetic process prior to the fifth arithmetic process, and then the fifth arithmetic process reflecting these results of the first and second solving processes may be executed. In this case, as the constraints to be considered in the first solving process as a pre-processing for the fifth arithmetic process, those relaxed from the constraints to be considered in the first solving process of the fifth arithmetic process by simplification or partial exclusion from objectives to be considered, particularly in constraints on the transferring operation are preferably used, and further, as the constraints to be considered in the second solving process as a pre-processing for the fifth arithmetic process, those relaxed from the constraints to be considered in the second solving process of the sixth arithmetic process by simplification or partial exclusion from objectives to be considered, particularly in constraints on the transferring operation are preferably used.

<6> In the aforementioned embodiment, the derived discharge pattern prescribes storage tank 10 that conducts discharge of LNG to each discharge line 14 corresponding to the aforementioned feed plan quantity per unit period (for example, one day) as exemplarily shown in FIG. 8. Here, feed plan quantity of feed plan information accepted as input information may be feed plan quantity per unit subdivided period (for example, one hour) that is further subdivided rather than per day. In this case, by counting up feed plan quantities per one hour as feed plan quantity per day, it is possible to derive a discharge pattern per day.

It is also a preferred embodiment that a final solution for the discharge pattern per day is derived in the third arithmetic process in step #4, and a new provisional solution for storage state transition reflecting the final solution is derived in the fourth arithmetic process in step #5, and then, as a post processing for the fourth arithmetic process, discharge quantity of LNG per one hour in the discharge pattern is derived by using these results, and the priority of operation of discharging pump 16 is determined.

Concretely, first processing means 4 solves an integer programming problem for confirming whether a predetermined constraint is satisfied on an hourly basis when a discharging operation is conducted in correspondence with feed plan quantity per hour based on the discharge pattern per day. In this case, as a solution algorithm, a column generation approach is used unlike the cases of other mixed-integer linear programming problems. The integer programming problem is configured as an integer programming problem for deriving a discrete variable that determines operation priority of discharging pump 16 when the discharge pattern derived for each discharge line 14 is given. As constraints, for example, part of constraints of material quantity constraints and heat quantity constraints in the discharging operation are used on an hourly basis. An objective function used herein is quantified variance between storage tank 10 that discharges LNG to each discharge line 14 on an hourly basis, and storage tank 10 that discharges on a daily basis depending on the derived discharge pattern when discharging pumps 16 are operated according to the priority. More concretely, assuming the priority, discharge quantity per hour from each storage tank 10 is derived, and the aforementioned constraint is determined by using the discharge quantity, and priority of discharging pumps 16 that minimizes the objective function is derived from those satisfying the constraint.

The derived priority of discharging pumps 16 is replaced for discharge pattern per day as a new discharge pattern per hour. It should be noted that when the priority of discharging pumps 16 varies from the discharge pattern on a daily basis, it is preferred to re-execute the third and fourth arithmetic processes or the fourth arithmetic process based on the priority, and to re-execute the aforementioned integer programming problem reflecting the derived results of the re-execution.

FIG. 9 illustrates an example of screen display in a tabular form of the discharge pattern indicating priority of discharging pumps 16. While the priority of discharging pumps 16 is displayed on a daily basis, a discharging operation on an hourly base corresponding to feed plan quantity per hour becomes possible. In the example shown in FIG. 9, for example, at point of time t=1, discharging pumps 16 are operated in the order of Q105, Q107, Q113, Q115, Q106, Q108, Q116, Q114, Q111, and Q112. At point of time t=1, when discharging pumps 16 are operated from Q105 to Q111, all of K103, K104, K106, K107, K108 of storage tanks 10 prescribed by the discharge pattern on a daily basis are discharge sources, and the same applies when the discharging pumps 16 up to Q112 are operated.

By determining the operation priority of discharging pumps 16 in this manner, it is possible to respond to the temporal change in the feed plan quantity per hour by changing the number of operating discharging pumps 16. For example, when the feed plan quantity is small, a small number of discharging pumps are operated at equal loads or in a discharge quantity ratio in proportion to the pumping ability, and when the feed plan quantity is increased, the number of operating pumps is increased in accordance with the priority and operation at equal loads is executed.

<7> In the aforementioned embodiment, description is made while assuming the case where the solving process for the operation plan problem at planning period T is executed as a single solving process independent of the planning period T. However, in the case of a single solving process, a particular solution can occur around end point of time (t=30) of planning period T. This is because a boundary condition exists on the start point of time (t=1) but not on the end point of time (t=30) side since tank initial state information containing initial storage quantity and initial storage heat quantity of LNG for each storage tank 10 is given as input information. For avoiding such a particular solution, when 20 days, for example, have lapsed before arrival of end point of time (t=30) of planning period T, it is preferred to conduct, at final point of time (t=20) of the lapse time, a solving process for the operation plan problem for planning period T' which is a new planning period starting from the next point of time (t=21) using the values of variables at point of time (t=20) of planning period T that have been already solved as initial conditions.

<8> In the aforementioned embodiment, the operation plan problem for storage tank 10 which is to be solved by the present system and the solving process for the operation plan problem by the present system 1 have been described with reference to the LNG storage facility group as exemplarily shown in FIG. 1 to FIG. 3. The numbers, arrangements, mutual connection relationships and the like of storage tank 10, transfer line 12, transferring pump 13, discharge line 14, discharging pumps 16 and so on constituting the LNG storage facility group are not limited to those exemplarily shown in FIG. 1 to FIG. 3. Further, planning period T, unit period, and unit subdivided period are not limited to those exemplarily shown in the above description.

<9> In the aforementioned embodiment, an operation plan problem is generated by converting heat quantity of LNG to density, however, since the present operation plan problem will also be a mixed-integer non-linear programming problem when heat quantity is defined as it is without being converted to density, and constraints on mass are stated as constraints on heat quantity, the solving processing procedure described in the above may be applied.

EXPLANATION OF REFERENCES 1 storage tank operation plan deriving system
2 arithmetic processing means
3 storage means
4 first processing means
5 second processing means
6 solving process controlling means
7 output means
10 storage tank
11 transportation means
12 transfer line
13 transferring pump
14 discharge line
15 feeding destination
16 discharging pump
A1, A2 area

The invention claimed is:

1. A storage tank operation plan deriving system, comprising:
 a storage device configured to accept respective inputs of tank initial state information containing initial storage quantity and initial storage heat quantity of liquefied natural gas of each of a plurality of storage tanks for storing the liquefied natural gas, reception plan information containing reception time, reception quantity and reception heat quantity of the liquefied natural gas in each of plural reception plans for the liquefied natural gas, and feed plan information containing feed plan quantity on a predetermined unit period basis in a feed plan for feeding the liquefied natural gas directly or after being vaporized from one or more discharge lines to feeding destinations assigned to each of the discharge lines, in a predetermined planning period, to save each information as input information, and to store a plurality of constraints on reception and storage of the liquefied natural gas into the storage tanks, and a plurality of constraints on discharge of the liquefied natural gas from the storage tanks to the discharge lines; and
 an arithmetic processing device configured with a computer and computer programs executable on the computer, the computer programs, when executed, finding a feasible solution for the storage tank operation plan problem at least on operations of reception and discharge of the liquefied natural gas configured as a mixed-integer non-linear programming problem by the input information and the constraints through computerized arithmetic processes,
 the computer programs including a first general-purpose solver for solving a mixed-integer linear programming problem, and a second general-purpose solver for solving a continuous non-linear programming problem, and a control program for controlling the first and second general-purpose solvers, the control program being configured to execute, given the input information:
a first solving process including conducting a first relaxing process on each of plural non-linear constraints containing a non-linear expression of the constraints, to replace the mixed-integer non-linear programming problem with a mixed-integer linear programming problem by linearly approximating a non-linear expression in a non-linear constraint in the constraints on reception and storage and part of the constraints on discharge without considering non-linear constraints contained in the remaining part of the constraints on discharge, and solving the mixed-integer linear programming problem by using the first general-purpose solver to derive at least provisional solutions or final solutions for a reception pattern that prescribes one or more of the storage tanks that are to be objectives of reception of the liquefied natural gas in each of the reception plans in the planning period, and a discharge pattern that prescribes the storage tank that is to discharge the liquefied natural gas corresponding to the feed plan quantity on the unit period basis, and
a second solving process including conducting a second relaxing process on a plurality of discrete form constraints containing discrete variables of the constraints, to replace the mixed-integer non-linear programming problem with a continuous non-linear programming problem by fixing every reception pattern and discrete variable using the result obtained in the preceding first solving process and considering the non-linear constraints contained in the remaining part of the constraints on discharge being not considered in the preceding first solving process, and solving the continuous non-linear programming problem by using the second general-purpose solver to derive at least provisional solutions or final solutions for transitions of storage quantity and storage heat quantity of the liquefied natural gas for each of the storage tanks, two or more times, respectively, and
in the first solving process of the second or later time, configured to execute the first relaxing process on at least part of the non-linear constraints by using provisional solutions for transitions of storage quantity and storage heat quantity of the liquefied natural gas derived in the preceding second solving process, and
in the second solving process of the first or later time, configured to execute the second relaxing process on at least part of the discrete form constraints, by using the discrete variables derived in the preceding first solving process,
wherein one or more storage tanks among the plurality of storage tanks is controlled to receive the liquefied natural gas of the reception quantity designated by the reception plan information at each point of the reception time as prescribed by the reception pattern, and
wherein one or more discharge pumps among a plurality of discharge pumps interposed between the storage tanks and the discharge line is controlled for discharge of the liquefied natural gas as prescribed by the discharge pattern.

2. The storage tank operation plan deriving system according to claim 1, wherein, given the input information, the control program is configured to execute in sequence:
a first arithmetic process that executes the first solving process to derive a final solution for the reception pattern, a provisional solution for the discharge pattern, and provisional solutions for transitions of storage quantity and storage heat quantity of the liquefied natural gas in each of the storage tanks,
a second arithmetic process that executes the second solving process based on the final solution and each of the provisional solutions derived through the first arithmetic process, to derive at least new provisional solutions for transitions of storage quantity and storage heat quantity of the liquefied natural gas in each of the storage tanks,
a third arithmetic process that executes the first solving process based on the final solution and each of most recent ones of the provisional solutions derived through the first and the second arithmetic processes, to derive at least a new provisional solution or a final solution for the discharge pattern, and
a fourth arithmetic process that executes the second solving process based on the final solution and each of most recent ones of the provisional solutions derived through the first to the third arithmetic processes, to derive at least new provisional solutions or final solutions for transitions of storage quantity and storage heat quantity of the liquefied natural gas in each of the storage tanks.

3. The storage tank operation plan deriving system according to claim 2, wherein, in the case where specific storage tanks of the plurality of storage tanks are connected by a transfer line, and the liquefied natural gas is transferable therebetween,
the storage device is configured to further store as constraints of the mixed-integer non-linear programming problem, a plurality of constraints on transfer of the liquefied natural gas between the storage tanks, and
the control program, given the input information, is configured to sequentially execute the first to the fourth arithmetic processes while not considering at least part of the constraints on transfer, to further derive a provisional solution for a transfer pattern that prescribes the specific storage tanks between which transfer of the liquefied natural gas is to be conducted in the planning period in the first arithmetic process, and a new provisional solution for the transfer pattern in the third arithmetic process, and to further execute:
a fifth arithmetic process that executes the first solving process based on the final solution and each of most recent ones of the provisional solutions derived through the first to the fourth arithmetic processes while considering the constraints on transfer, to derive a new provisional solution of the transfer pattern, and
a sixth arithmetic process that executes the second solving process based on the final solution and each of most recent ones of the provisional solutions derived through the first to the fifth arithmetic processes while considering the constraints on transfer, to derive final solutions for transitions of storage quantity and storage heat quantity of the liquefied natural gas in each of the storage tanks and a final solution of the transfer pattern.

4. The storage tank operation plan deriving system according to claim 1, wherein the control program is configured to execute the first and the second solving processes by using density of the liquefied natural gas that can be approximately converted into the heat quantity in place of heat quantity of the liquefied natural gas contained in the input information and the constraints, and to derive a provisional solution for transition of density of the liquefied natural gas in each of the storage tanks in place of the provisional solution for transition of storage heat quantity of the liquefied natural gas in each of the storage tanks.

5. The storage tank operation plan deriving system according to claim 4, wherein in the first relaxing process, mass of the liquefied natural gas represented by a non-linear expression of product of density and volume of the liquefied natural gas contained in the constraints is linearly approximated to a linear polynomial composed of a volume term including standard density as a coefficient, a density term including standard volume as a coefficient, and a constant term.

6. The storage tank operation plan deriving system according to claim 1, wherein, in the first and the second solving processes, the control program is configured to derive the final solution and the provisional solutions as feasible solutions that minimize an objective function established by weighted summing one or more penalty, the penalty being deviation from a predetermined standard value of an item to be monitored defined by at least one variable of the continuous variables and the discrete variables.

7. The storage tank operation plan deriving system according to claim 6, wherein in at least one of the first and the second solving processes, deviation between average heat quantity of the liquefied natural gas fed in a predetermined period for each discharge line, and a predetermined standard heat quantity is contained as one of the penalty.

8. The storage tank operation plan deriving system according to claim 1, wherein
the storage device is configured to further accept input of detailed feed plan information containing feed plan quantity per unit subdivided period that is subdivision of the predetermined unit period, and to save the information as the input information, and
the control program is configured to derive final solutions of the reception pattern and the discharge pattern by executing the first and the second solving processes at least twice, respectively, and to derive subsequently, given the input information containing the detailed feed plan information, discharge quantity per unit subdivided period for each of the storage tanks based on the derived final solutions and each of the preceding provisional solutions.

9. The storage tank operation plan deriving system according to claim 1, wherein the control program uses a processing result at the last point of time of an elapsed part of first planning period that has started but not ended yet, as an initial condition in the first and the second solving processes for a second planning period that starts from the beginning of an unelapsed part of the first planning period.

10. The storage tank operation plan deriving system according to claim 1, wherein the constraints contain a constraint for preventing layering that occurs when the liquefied natural gases having different compositions are stored in the storage tank.

11. A storage tank operation plan deriving method comprising:
an input information storage step of accepting respective inputs of tank initial state information containing initial storage quantity and initial storage heat quantity of liquefied natural gas of each of a plurality of storage tanks for storing the liquefied natural gas, reception plan information containing reception time, reception quantity and reception heat quantity of the liquefied natural gas in each of plural reception plans for the liquefied natural gas, and feed plan information containing feed plan quantity on a predetermined unit period basis in a feed plan for feeding the liquefied natural gas directly or after being vaporized from one or more discharge lines to feeding destinations assigned to each of the discharge lines, in a predetermined planning period, and saving each information as input information in predetermined storage device; and
an arithmetic processing step of finding a feasible solution for the storage tank operation plan problem at least on operations of reception and discharge of the liquefied natural gas configured as a mixed-integer non-linear programming problem by the input information, a plurality of constraints on reception and storage of the liquefied natural gas into the storage tanks, and a plurality of constraints on discharge of the liquefied natural gas from the storage tanks to the discharge lines through computerized arithmetic processes,
wherein, in the arithmetic processing step, given the input information,
a first solving process including conducting a first relaxing process on each of plural non-linear constraints containing a non-linear expression of the constraints, to replace the mixed-integer non-linear programming problem with a mixed-integer linear programming problem by linearly approximating a non-linear expression in a non-linear constraint in the constraints on reception and storage and part of the constraints on discharge without considering non-linear constraints contained in the remaining part of the constraints on discharge, and solving the mixed-integer linear programming problem by using a first general-purpose solver to derive at least provisional solutions or final solutions for a reception pattern that prescribes one or more of the storage tanks that are to be objectives of reception of the liquefied natural gas in each of the reception plans in the planning period, and a discharge pattern that prescribes the storage tank that is to discharge the liquefied natural gas corresponding to the feed plan quantity on the unit period basis, and
a second solving process including conducting a second relaxing process on a plurality of discrete form constraints containing discrete variables of the constraints, to replace the mixed-integer non-linear programming problem with a continuous non-linear programming problem by fixing every reception pattern and discrete variable using the result obtained in the preceding first solving process and considering the non-linear constraints contained in the remaining part of the constraints on discharge being not considered in the preceding first solving process, and solving the continuous non-linear programming problem by using a second general-purpose solver to derive at least provisional solutions or final solutions for transitions of storage quantity and storage heat quantity of the liquefied natural gas for each of the storage tanks are executed two or more times, respectively, and
in the first solving process of the second or later time, the first relaxing process is executed on at least part of the non-linear constraints by using provisional solutions for transitions of storage quantity and storage heat quantity of the liquefied natural gas derived in the preceding second solving process, and
in the second solving process of the first or later time, the second relaxing process is executed on at least part of the discrete form constraints, by using the discrete variables derived in the preceding first solving process,
wherein the method further comprises:
a step of controlling one or more storage tanks among the plurality of storage tanks to receive the liquefied natural gas of the reception quantity designated by the reception plan information at each point of the reception time as prescribed by the reception pattern; and a step of controlling one or more discharge pumps among a plurality of discharge pumps interposed between the storage tanks and the discharge line for discharge of the liquefied natural gas as prescribed by the discharge pattern.

12. The storage tank operation plan deriving method according to claim 11, wherein, in the arithmetic processing step, given the input information, a first arithmetic process that executes the first solving process to derive a final solution for the reception pattern, a provisional solution for the discharge pattern, and provisional solutions for transitions of storage quantity and storage heat quantity of the liquefied natural gas in each of the storage tanks, a second arithmetic process that executes the second solving process based on the final solution and each of the provisional solutions derived through the first arithmetic process, to derive at least new provisional solutions for transitions of storage quantity and storage heat quantity of the liquefied natural gas in each of the storage tanks, a third arithmetic process that executes the first solving process based on the final solution and each of most recent ones of the provisional solutions derived through the first and the second arithmetic processes, to derive at least a new provisional solution or a final solution for the discharge pattern, and a fourth arithmetic process that executes the second solving process based on the final solution and each of most recent ones of the provisional solutions derived through the first to the third arithmetic processes, to derive at least new provisional solutions or final solutions for transitions of storage quantity and storage heat quantity of the liquefied natural gas in each of the storage tanks are executed in sequence.

13. The storage tank operation plan deriving method according to claim 12, wherein, in the case where specific storage tanks of the plurality of storage tanks are connected by a transfer line, and the liquefied natural gas is transferable therebetween, as constraints of the mixed-integer non-linear programming problem, a plurality of constraints on transfer of the liquefied natural gas between the storage tanks are further included, in the arithmetic processing step, given the input information, the first to the fourth arithmetic processes are sequentially executed while at least part of the constraints on transfer are not considered to further derive a provisional solution for a transfer pattern that prescribes the specific storage tanks between which transfer of the liquefied natural gas is to be conducted in the planning period in the first arithmetic process, and a new provisional solution for the transfer pattern in the third arithmetic process, and a fifth arithmetic process that executes the first solving process based on the final solution and each of most recent ones of the provisional solutions derived through the first to the fourth arithmetic processes while considering the constraints on transfer, to derive a new provisional solution of the transfer pattern, and a sixth arithmetic process that executes the second solving process based on the final solution and each of most recent ones of the provisional solutions derived through the first to the fifth arithmetic processes while considering the constraints on transfer, to derive final solutions for transitions of storage quantity and storage heat quantity of the liquefied natural gas in each of the storage tanks and a final solution of the transfer pattern are executed.

14. The storage tank operation plan deriving method according to claim 11, wherein, in the arithmetic processing step, the first and the second solving processes are executed by using density of the liquefied natural gas that can be approximately converted into the heat quantity in place of heat quantity of the liquefied natural gas contained in the input information and the constraints, to derive a provisional solution for transition of density of the liquefied natural gas in each of the storage tanks in place of the provisional solution for transition of storage heat quantity of the liquefied natural gas in each of the storage tanks.

15. The storage tank operation plan deriving method according to claim 14, wherein in the first relaxing process, mass of the liquefied natural gas represented by a non-linear expression of product of density and volume of the liquefied natural gas contained in the constraints is linearly approximated to a linear polynomial composed of a volume term including standard density as a coefficient, a density term including standard volume as a coefficient, and a constant term.

16. The storage tank operation plan deriving method according to claim 11, wherein, in the first and the second solving processes of the arithmetic processing step, the final solution and the provisional solutions are derived as feasible solutions that minimize an objective function established by weighted summing one or more penalty, the penalty being deviation from a predetermined standard value of an item to be monitored defined by at least one variable of the continuous variables and the discrete variables.

17. The storage tank operation plan deriving method according to claim 16, wherein in at least one of the first and the second solving processes of the arithmetic processing step, deviation between average heat quantity of the liquefied natural gas fed in a predetermined period for each discharge line, and a predetermined standard heat quantity is contained as one of the penalty.

18. The storage tank operation plan deriving method according to claim 11, wherein in the input information storage step, input of detailed feed plan information containing feed plan quantity per unit subdivided period that is subdivision of the predetermined unit period is further accepted, and the information is saved as the input information, and in the arithmetic processing step, the first and the second solving processes are executed at least twice, respectively, to derive final solutions of the reception pattern and the discharge pattern, and then given the input information containing the detailed feed plan information, discharge quantity per unit subdivided period for each of the storage tanks is derived based on the derived final solutions and each of the preceding provisional solutions.

19. The storage tank operation plan deriving method according to claim 11, wherein in the arithmetic processing step, a processing result at the last point of time of an lapsed part of first planning period that has started but not ended yet is used, as an initial condition in the first and the second solving processes for a second planning period that starts from the beginning of an unelapsed part of the first planning period.

20. The storage tank operation plan deriving method according to claim 11, wherein the constraints contain a constraint for preventing layering that occurs when the liquefied natural gases having different compositions are stored in the storage tank.

* * * * *